US006857376B2

(12) United States Patent
Coslovi et al.

(10) Patent No.: US 6,857,376 B2
(45) Date of Patent: Feb. 22, 2005

(54) VEHICLE CARRYING RAIL ROAD CAR

(75) Inventors: Ilario A. Coslovi, Burlington (CA);
James W. Forbes, Campbellville (CA)

(73) Assignee: National Steel Car Limited (CA)

( * ) Notice: Subject to any disclaimer, the term of this patent is extended or adjusted under 35 U.S.C. 154(b) by 0 days.

(21) Appl. No.: 10/406,642

(22) Filed: Apr. 1, 2003

(65) Prior Publication Data

US 2004/0007151 A1 Jan. 15, 2004

Related U.S. Application Data

(63) Continuation of application No. 09/650,500, filed on Aug. 29, 2000, now Pat. No. 6,550,400, and a continuation of application No. 09/651,544, filed on Aug. 29, 2000, now Pat. No. 6,539,878.

(51) Int. Cl.$^7$ .............................................. B61D 49/00
(52) U.S. Cl. ...................................................... 105/458
(58) Field of Search .................................. 105/458, 4.1

(56) References Cited

U.S. PATENT DOCUMENTS

| | | | | |
|---|---|---|---|---|
| 84,808 A | | 12/1868 | Elder .......................... | 105/458 |
| 479,533 A | | 7/1892 | Schulz ........................ | 14/71.1 |
| 895,157 A | | 8/1908 | Bush | |
| 1,040,529 A | | 10/1912 | Douglas ...................... | 105/458 |
| 1,316,553 A | | 9/1919 | Barber | |
| 1,955,473 A | | 4/1934 | Raymer ........................ | 182/9 |
| 2,052,867 A | | 9/1936 | Cartzdafner ............. | 105/406.2 |
| 2,285,207 A | | 6/1942 | Johnson ...................... | 414/522 |
| 2,697,989 A | | 12/1954 | Shafer | |
| 2,717,558 A | | 9/1955 | Shafer | |
| 2,737,907 A | | 3/1956 | Janeway | |
| 2,788,751 A | | 4/1957 | Russell ........................ | 105/458 |
| 2,916,238 A | | 12/1959 | Fahland ...................... | 410/58 |
| 3,003,167 A | * | 10/1961 | Smith .......................... | 105/458 |
| 3,003,434 A | | 10/1961 | Clejan ........................ | 410/60 |
| 3,004,500 A | * | 10/1961 | Johnson ...................... | 105/458 |
| 3,012,524 A | | 12/1961 | Buisson ........................ | 410/65 |
| 3,094,946 A | * | 6/1963 | Bain et al. ................... | 105/458 |
| 3,161,153 A | * | 12/1964 | Johnson ...................... | 105/458 |
| 3,162,145 A | | 12/1964 | Franklin ...................... | 105/355 |
| 3,195,478 A | | 7/1965 | Thompson ................... | 105/458 |
| 3,228,355 A | * | 1/1966 | Black ........................... | 105/458 |
| 3,323,472 A | * | 6/1967 | Boone et al. ............... | 105/458 |

(List continued on next page.)

FOREIGN PATENT DOCUMENTS

| | | |
|---|---|---|
| EP | 0 345 497 A2 | 12/1989 |
| FR | 2 305 633 | 10/1976 |
| GB | 2 145 989 A | 4/1985 |
| WO | WO 92/05046 A1 | 4/1992 |

OTHER PUBLICATIONS

Anonymous, "Photos of experimental multi–use articulated rail road flat car with short travel draft gear and reduced slack couplers,".

Primary Examiner—Lars A. Olson
(74) Attorney, Agent, or Firm—Hahn Loeser & Parks LLP; Michael H. Minns

(57) ABSTRACT

A rail road car has a deck for carrying wheeled vehicles. The rail road car can be coupled to other rail road cars of the same type. Bridge plates are provide that permit wheeled vehicles to be conducted between adjacent rail road cars. The bridge plates have one end mounted to the rail road car at a pivot fitting. The pivot fitting allows the bridge plate to be moved from a length-wise position spanning the gap between cars, to a cross-wise stowed position. The bridge plates have fittings which permit three degrees of freedom relative to the adjacent rail road cars, namely a first degree of freedom to tolerate yawing motion of the first rail road car, a second degree of freedom to accommodate yawing motion of the second rail road car, and a third degree of freedom to accommodate variation in distance between the respective portions of the rail road cars to which the bridge plate is mounted while the rail road cars are moving.

23 Claims, 26 Drawing Sheets

U.S. PATENT DOCUMENTS

| | | | |
|---|---|---|---|
| 3,348,502 A | 10/1967 | Burns | 410/1 |
| 3,357,371 A | 12/1967 | Gutridge | 410/54 |
| 3,362,353 A | 1/1968 | Johnson | 410/60 |
| 3,370,550 A | 2/1968 | Gutridge | 410/54 |
| 3,421,454 A * | 1/1969 | Connerat | 105/458 |
| 3,497,169 A | 2/1970 | Enochian | 410/60 |
| 4,035,866 A | 7/1977 | Pickles | 16/325 |
| 4,058,228 A | 11/1977 | Hall | 414/549 |
| 4,065,825 A | 1/1978 | Cohen | 14/72.5 |
| 4,129,079 A | 12/1978 | Shannon | 410/1 |
| 4,168,671 A | 9/1979 | Roberts | 112/217.1 |
| 4,191,107 A * | 3/1980 | Ferris et al. | 105/4.1 |
| 4,339,996 A | 7/1982 | Brodeur et al. | 105/3 |
| 4,516,506 A | 5/1985 | Paton | 105/3 |
| 4,562,633 A | 1/1986 | Adams | 29/401.1 |
| 4,613,155 A | 9/1986 | Greenwood | 280/760 |
| 4,677,918 A | 7/1987 | Baker | 105/378 |
| 4,686,909 A | 8/1987 | Burleson | 105/378 |
| 4,718,353 A | 1/1988 | Schuller | 105/406.1 |
| 4,721,426 A | 1/1988 | Bell | 414/340 |
| 4,751,882 A | 6/1988 | Wheatley | 105/4.1 |
| 4,825,778 A | 5/1989 | Riley | 105/393 |
| 4,917,019 A | 4/1990 | Hesch | 105/4.1 |
| 4,929,132 A | 5/1990 | Yeates | 410/56 |
| 5,001,990 A | 3/1991 | Pavlick | 105/375 |
| 5,017,065 A | 5/1991 | Krug | 410/58 |
| 5,074,725 A | 12/1991 | Pavlick | 410/54 |
| 5,161,469 A | 11/1992 | Hesch | 105/404 |
| 5,207,161 A | 5/1993 | Pileggi | 105/4.1 |
| 5,246,321 A | 9/1993 | Hesch | 410/58 |
| 5,257,894 A | 11/1993 | Grant | 414/537 |
| 5,338,050 A | 8/1994 | Haire | 280/476.1 |
| 5,452,664 A | 9/1995 | Richmond | 105/4.1 |
| 5,596,936 A | 1/1997 | Bullock | 105/458 |
| 5,622,115 A | 4/1997 | Ehrlich | 105/3 |
| 5,657,698 A | 8/1997 | Black | 105/3 |
| 5,733,091 A | 3/1998 | Long | 414/333 |
| 5,743,191 A | 4/1998 | Coslovi | 105/355 |
| 5,743,192 A | 4/1998 | Saxton | 105/355 |
| 5,782,187 A | 7/1998 | Black | 105/3 |
| 5,826,517 A | 10/1998 | Larson | 105/4.3 |
| 5,842,821 A | 12/1998 | Coslovi | 410/73 |
| 5,845,584 A * | 12/1998 | Bullock et al. | 105/458 |
| 5,868,379 A | 2/1999 | Ellis | 254/124 |
| 6,138,579 A | 10/2000 | Khattab | 105/370 |

* cited by examiner

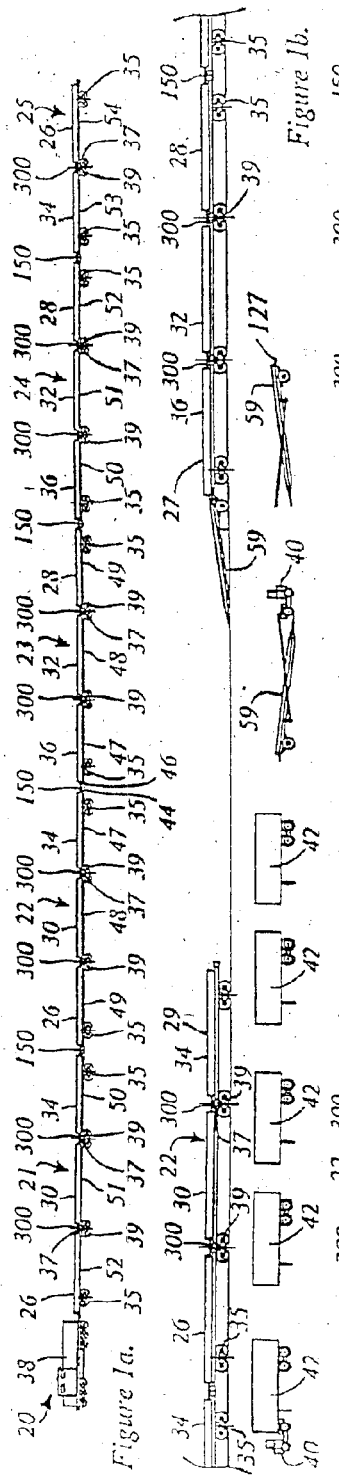

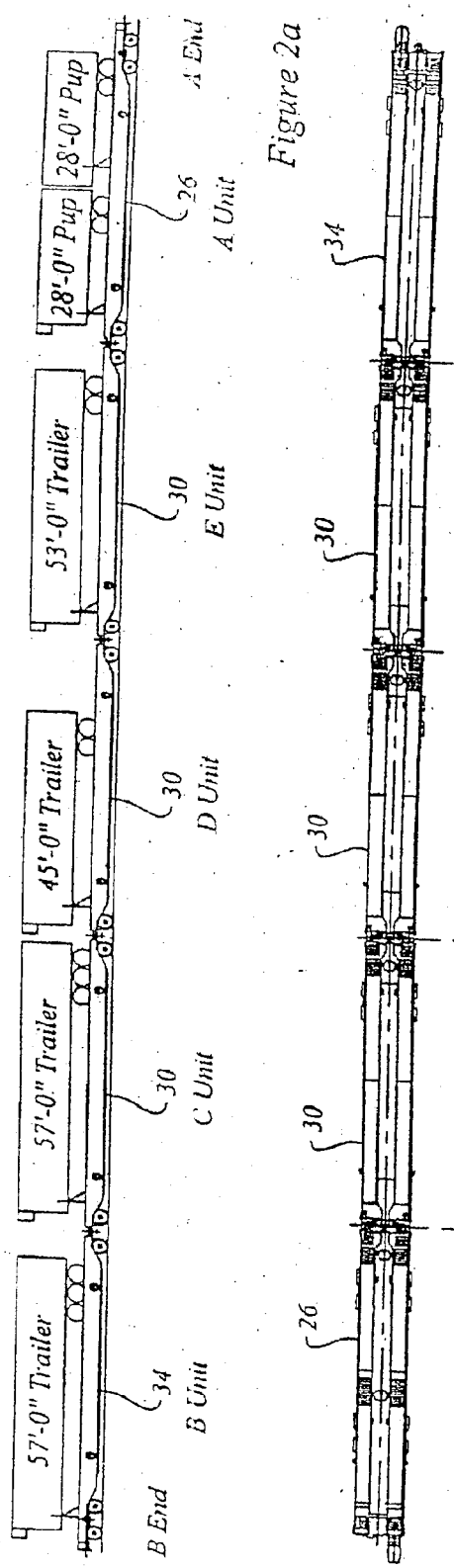
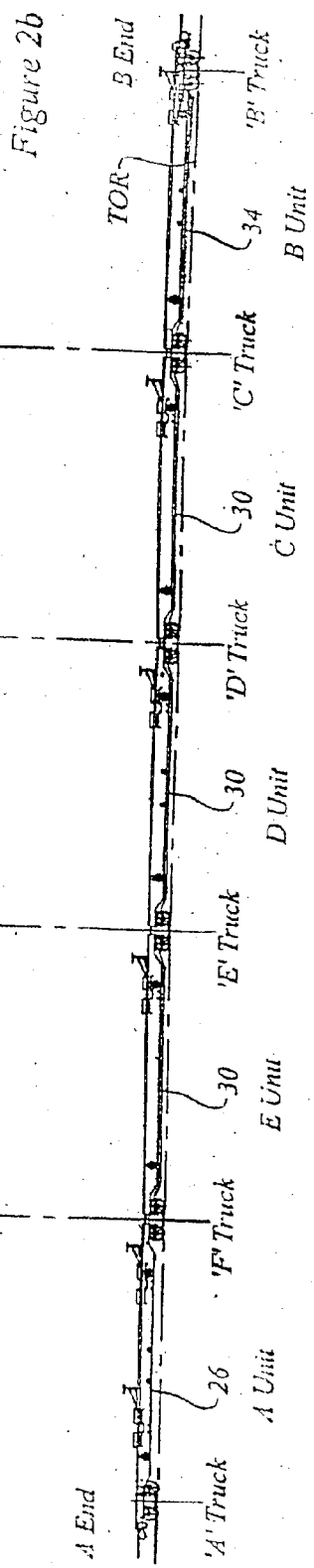
Figure 2a
Figure 2b
Figure 2c

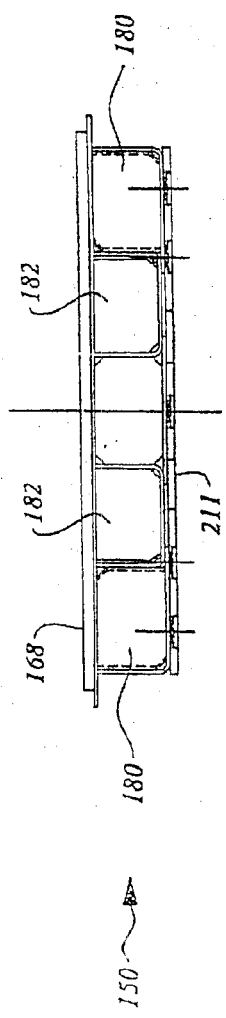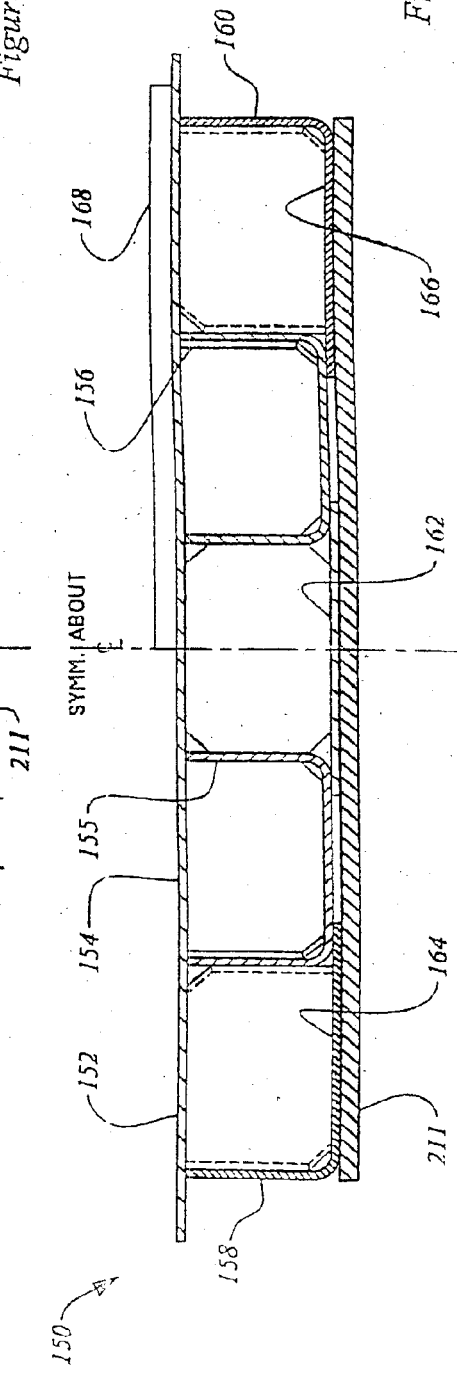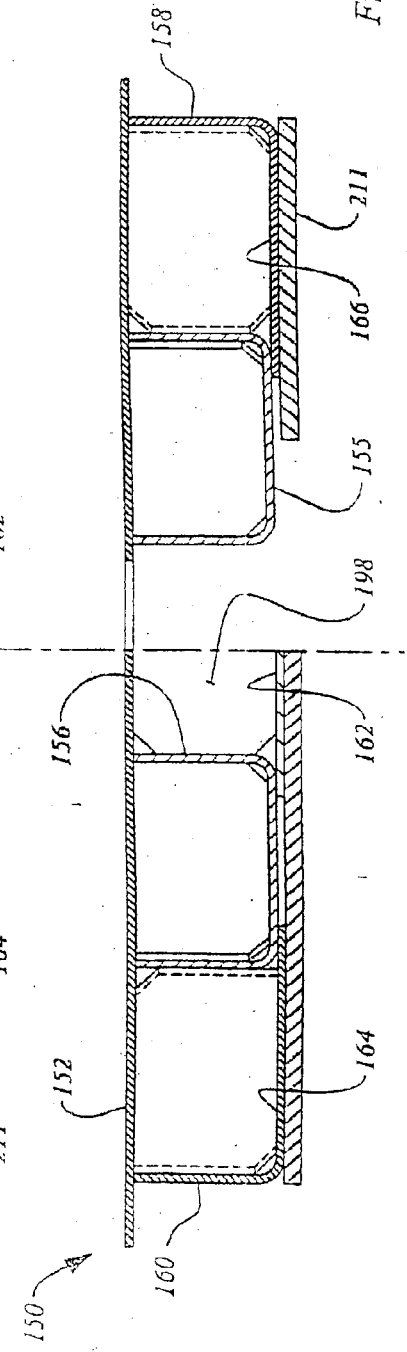

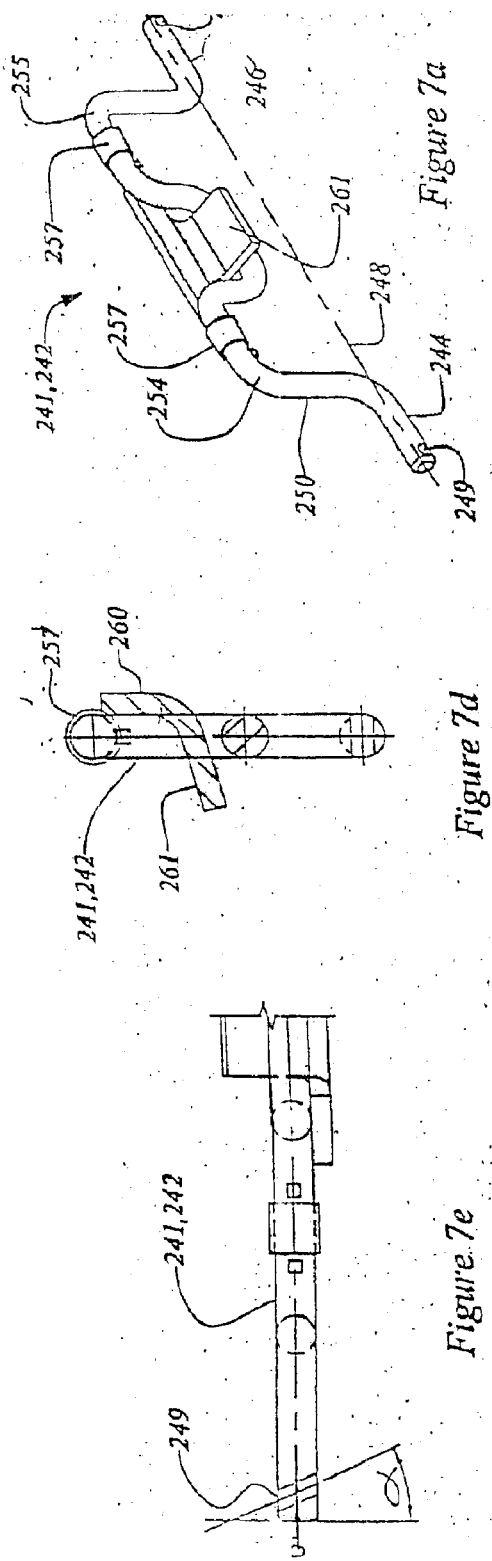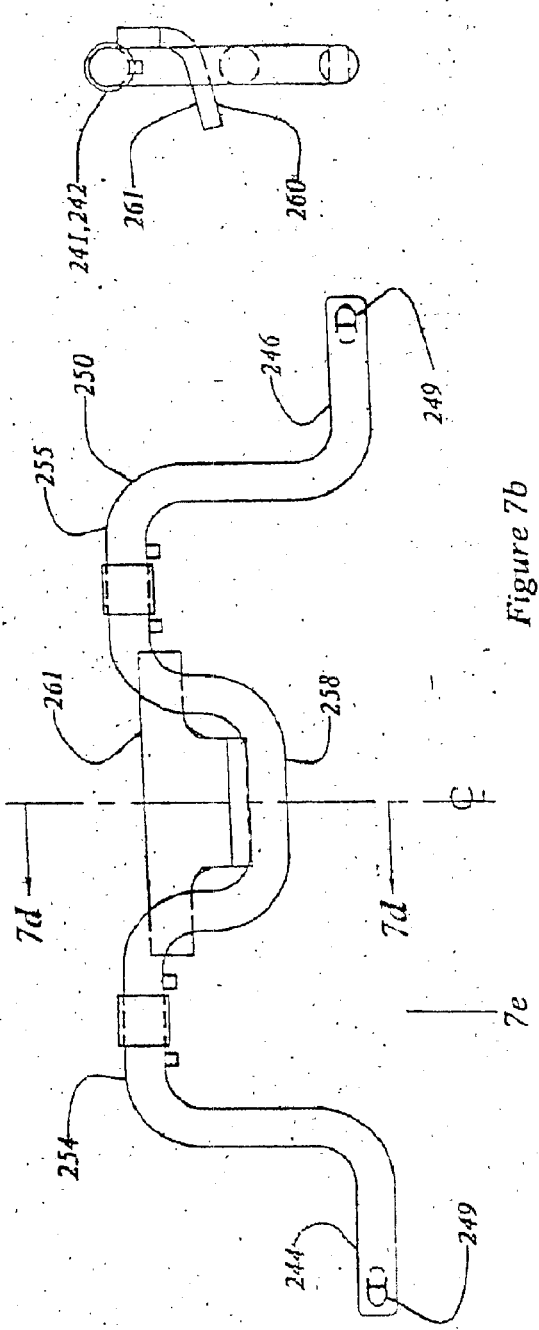

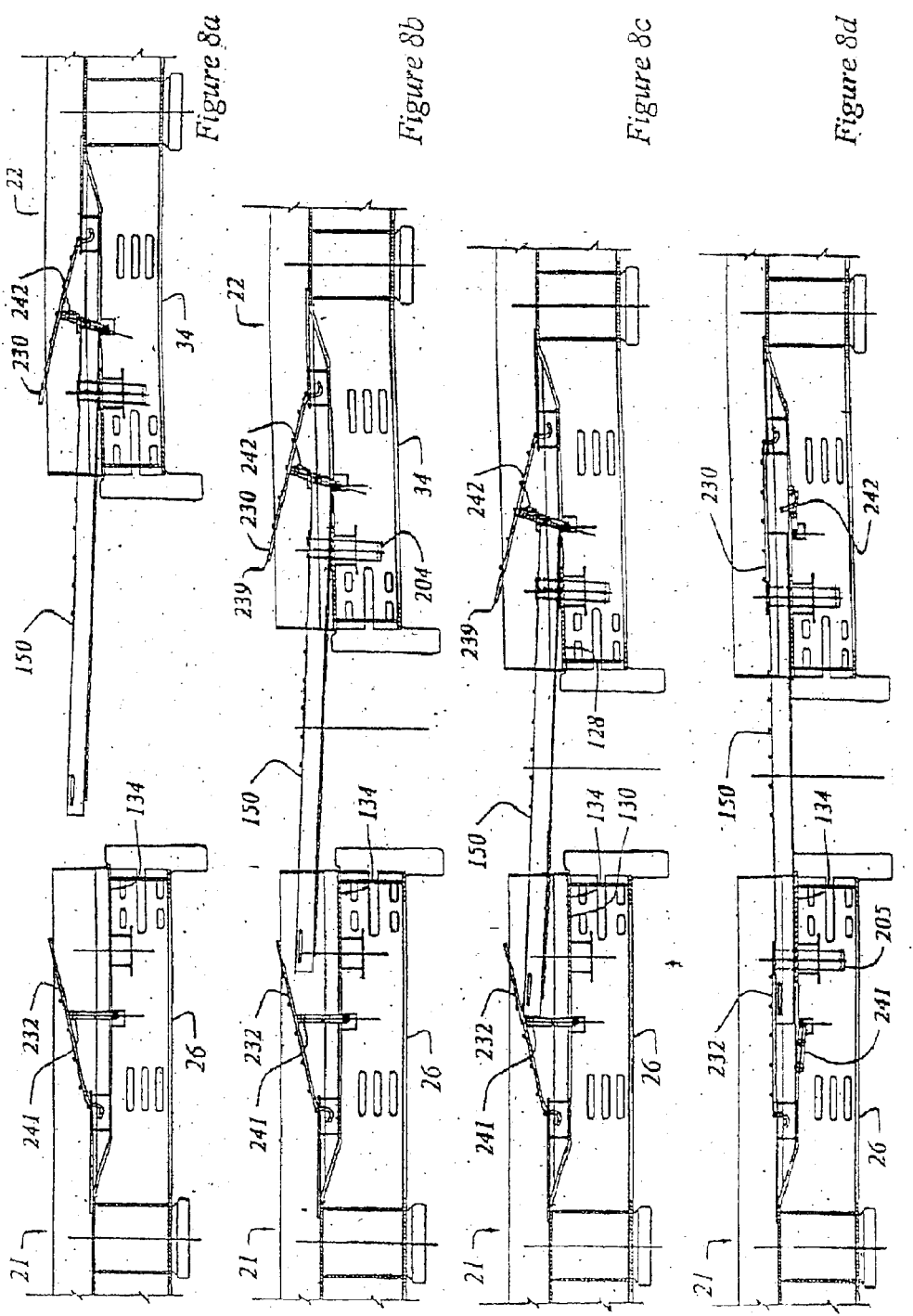

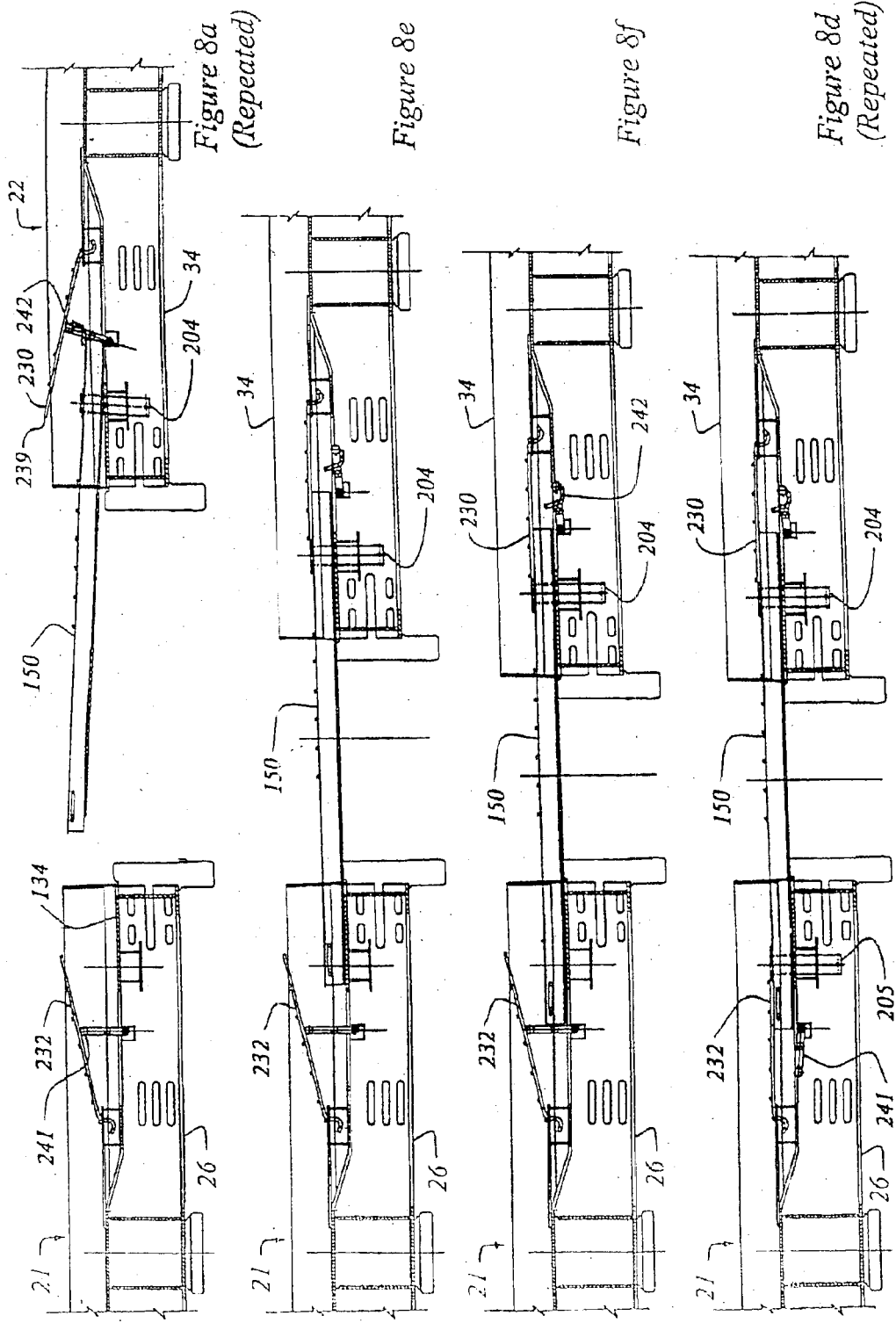

ARTICULATED COUPLING

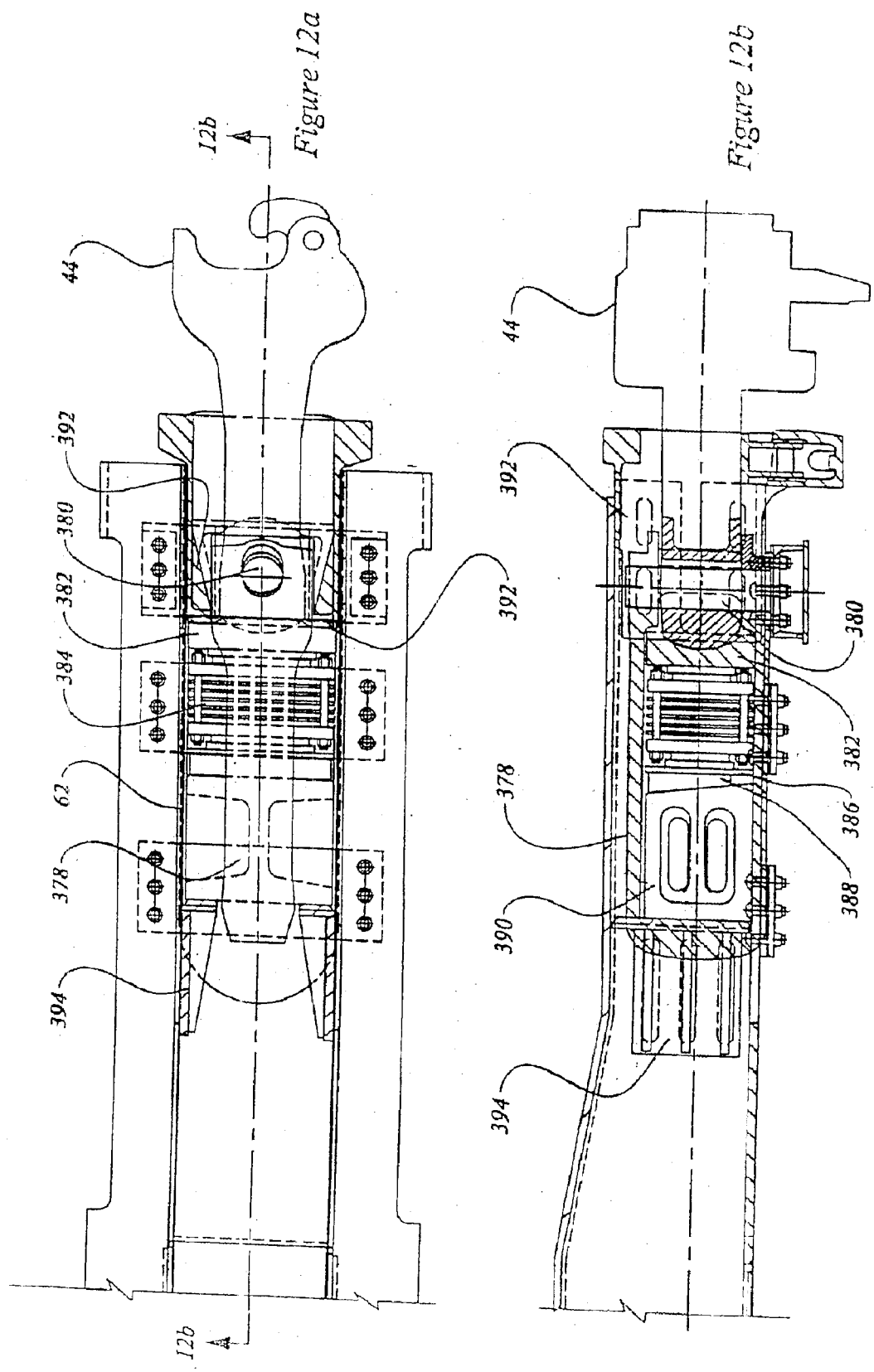

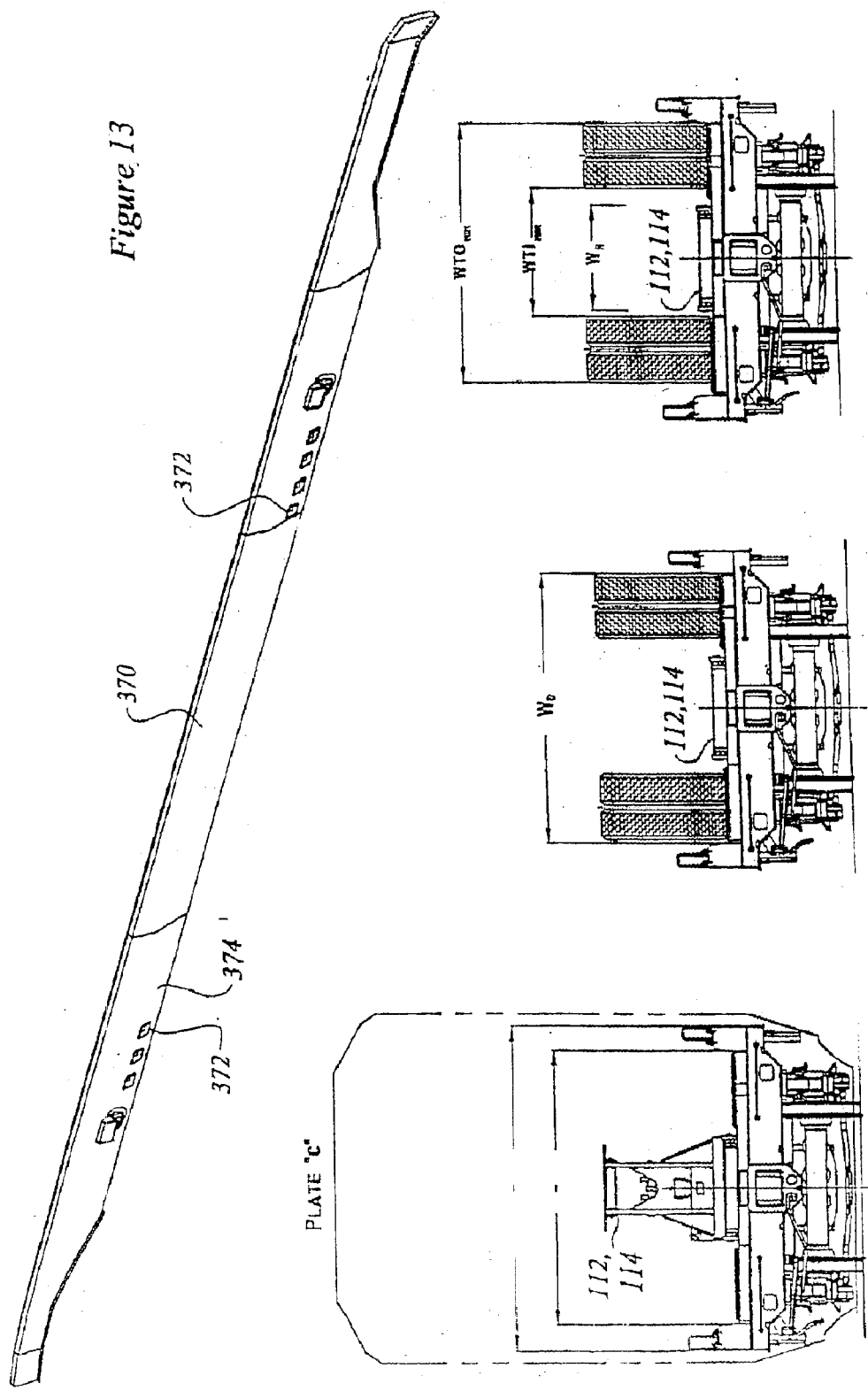

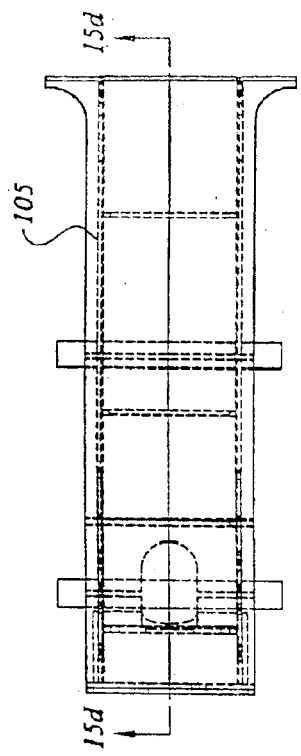
Figure 15b
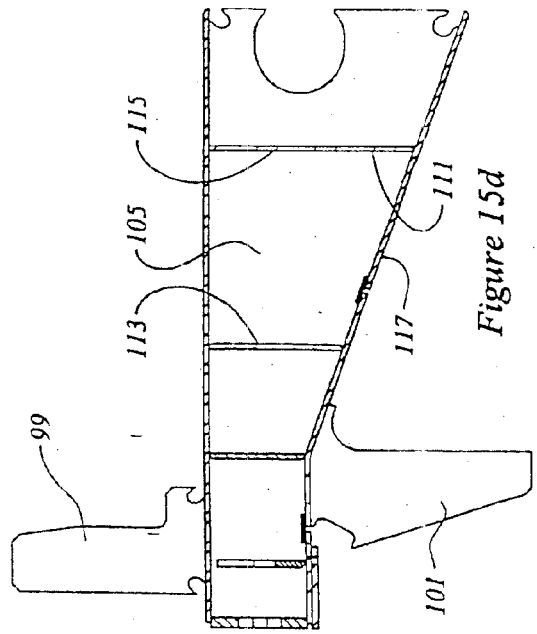
Figure 15d
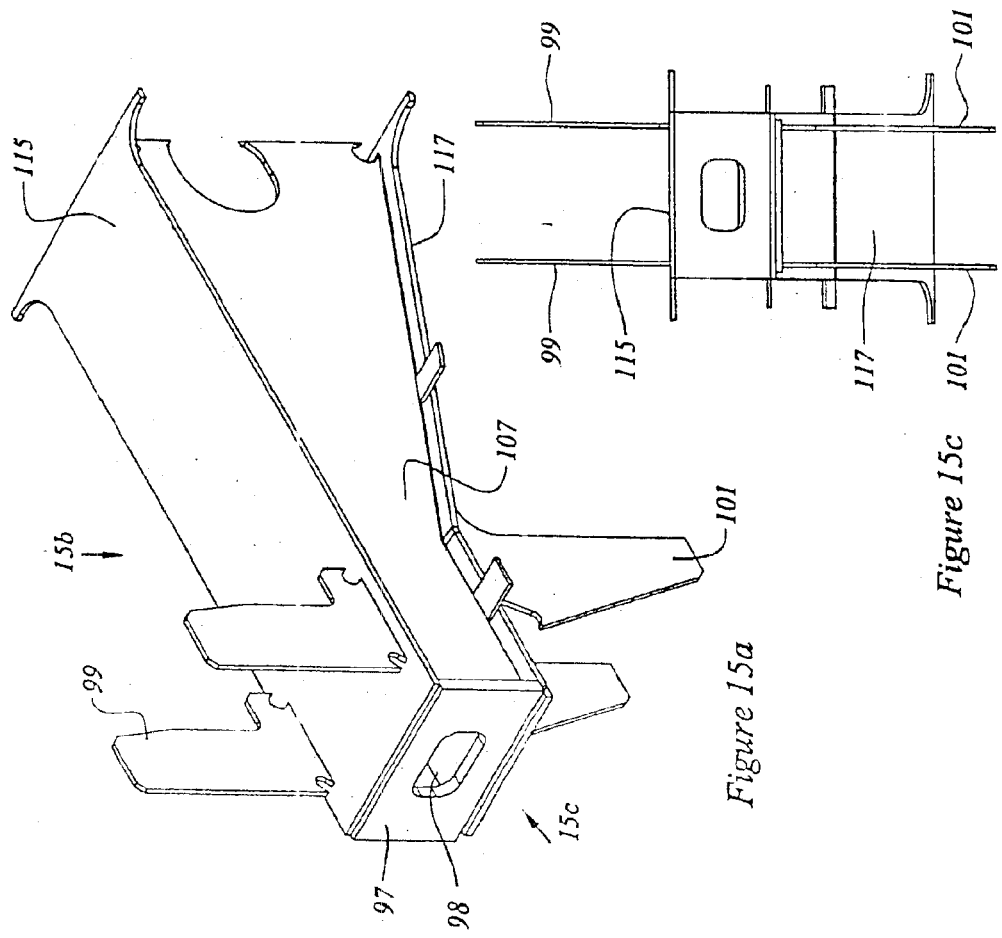
Figure 15a
Figure 15c

VEHICLE CARRYING RAIL ROAD CAR

This application is filed as a continuation of Ser. No. 09/650,500, filed 29 Aug. 2000, now U.S. Pat. No. 6,550,400 and Ser. No. 09/651,544, also filed on 29 Aug. 2000, now U.S. Pat. No. 6,539,878. Application Ser. No. 09/650,500 is incorporated by reference as if fully recited herein.

FIELD OF THE INVENTION

This invention relates to the field of rail road cars for carrying wheeled vehicles.

BACKGROUND OF THE INVENTION

Railroad flat cars are used to transport highway trailers from one place to another in what is referred to as intermodal Trailer-on-Flat-Car (TOFC) service. TOFC service competes with intermodal container service known as Container-on-Flat-Car (COFC), and with truck trailers driven on the highway. TOFC service has been in relative decline for some years due to a number of disadvantages.

First, for distances of less than about 500 miles (800 km), TOFC service is thought to be slower and less flexible than highway operation. Second, in terms of lading per rail car, TOFC tends to be less efficient than Container-on-Flat-Car (COFC) service, and tends also to be less efficient than double-stack COFC service in which containers are carried on top of each other. Third, TOFC (and COFC) terminals tend to require significant capital outlays. Fourth, TOFC loading tends to take a relatively long time to permit rail road cars to be shunted to the right tracks, for trailers to be unloaded from incoming cars, for other trailers to be loaded, and for the rail road cars to be shunted again to make up a new train consist. Fifth, shock and other dynamic loads imparted during shunting and train operation may tend to damage the lading. It would be advantageous to improve rail road car equipment to reduce or eliminate some of these disadvantages.

As highways have become more crowded, demand for a fast TOFC service has increased. Recently, there has been an effort to reduce the loading and unloading time in TOFC service, and an effort to increase the length of TOFC trains. There are two methods for loading highway trailers on flat cars. First, they can be side-loaded with an overhead crane or side-lifting fork-lift crane. Loading with overhead cranes, or with specialized fork-lift equipment tends to occur at large yards, and tends to be capital intensive.

The second method of loading highway trailers, or other wheeled vehicles, onto rail road cars having decks for carrying vehicles, is by end-loading. End-loading, or circus loading as it is called, has two main variations. First, a string of cars can be backed up to a permanently fixed loading dock, typically a concrete structure having a deck level with the deck of the rail cars. Alternatively, a movable ramp can be placed at one end of a string of rail car units. In either case, the vehicles are driven onto the rail road cars from one end. Each vehicle can be loaded in sequence by driving (in the case of highway trailers, by driving the trailers backward) along the decks of the rail road car units. The gaps between successive rail car units are spanned by bridge plates that permit vehicles to be driven from one rail car unit to the next. Although circus loading is common for a string of cars, end-loading can be used for individual rail car units, or multiple rail car units as may be convenient.

One way to reduce shunting time, and to run a more cost effective service is to operate a dedicated unit train of TOFC cars whose cars are only rarely uncoupled. However, as the number of units in the train increases, circus loading becomes less attractive, since a greater proportion of loading time is spent running a towing rig back and forth along an empty string of cars. It is therefore advantageous to break the unit train in several places when loading and unloading. Although multiple fixed platforms have been used, each fixed platform requires a corresponding dedicated dead-end siding to which a separate portion of train can be shunted. It is not advantageous to require a large number of dedicated parallel sidings with a relatively large fixed investment in concrete platforms.

To avoid shunting to different tracks, as required if a plurality of fixed platforms is used, it is advantageous to break a unit train of TOFC rail road cars on a single siding, so that the train can be re-assembled without switching from one track to another. For example, using a 5000 or 6000 ft siding, a train having 60 rail car units in sections of 15 units made up of three coupled five-pack articulated cars, can be split at two places, namely fifteen units from each end, permitting the sequential loading of fifteen units per section to either side of each split. Once loaded, the gaps between the splits can be closed, without shunting cars from one siding to another. Use of a single siding is made possible by moving the ramps to the split location, rather than switching strings of cars to fixed platforms.

In using movable ramps for loading, the highway trailers are typically backed onto the railcars using a special rail yard truck, called a hostler truck. Railcars can be equipped with a collapsible highway trailer kingpin stand. When the highway trailer is in the right position, the hostler truck hooks onto the collapsible stand (or hitch) and pulls it forward, thereby lifting it to a deployed (i.e., raised) and locked position. The hostler truck is then used to push the trailer back to engage the kingpin of the hitch. The landing gear of the highway trailer is lowered, and, in addition, it is cranked downward firmly against the rail road car deck as a safety measure in the event of a hitch failure or the king pin of the trailer is sheared off. Once one trailer has been loaded, the towing rig, namely the hostler truck, drives back to the end of the string, another trailer is backed into place, and the process is repeated until all of the trailers have been loaded in the successive positions on the string of railcars. Unloading involves the same process, in reverse. In some circumstances circus loaded flat cars can be loaded with trucks, tractors, farm machinery, construction equipment or automobiles, in a similar manner, except that it is not always necessary to use a towing rig.

From time to time the train consist may be broken up, with various highway-trailer-carrying rail road cars being disconnected, and others being joined. Bridge plates have been the source of some difficulties at the rail car ends where adjacent railroad cars are connected, given the nomenclature "the coupler ends". Traditionally, a pair of cars to be joined at a coupler would each be equipped with one bridge plate permanently mounted on a hinged connection on one side of the car, typically the left hand side. In this arrangement the axis of the hinge is horizontal and transverse to the longitudinal centerline of the rail car.

Conventionally, for loading and unloading operations, the bridge plate of each car at the respective coupled end is lowered, like a draw bridge, into a generally horizontal arrangement to mate with the adjoining car, each plate providing one side of the path so that the co-operative effect of the two plates is to provide a pair of tracks along which a vehicle can roll. When loading is complete, the bridge plates are pivoted about their hinges to a generally vertical, or raised, position, and locked in place so that they cannot fall back down accidentally.

Conventionally, bridge plates at the coupler ends are returned to the raised, or vertical, position before the train can move, to avoid the tendency to become jammed or damaged during travel. That is, as the train travels through a curve, the bridge plates would tend to break off if left in the spanning position between the coupler ends of two rail road cars. Since bridge plates carry multi-ton loads, they tend to have significant structure and weight. Consequently, the requirement to raise and lower the bridge plates into position is a time consuming manual task contributing to the relatively long time required for loading and unloading. Raising and lowering bridge plates may tend to expose rail-yard personnel to both accidents and repetitive strain injuries caused by lifting.

It would be advantageous to have (a) a bridge plate that can be moved to a storage, or stowed, position, with less lifting; (b) a bridge plate system that does not require the bridge plate to be moved by hand as often, such as by permitting the bridge plate to remain in place during train operation, rather than having to be lowered every time the train is loaded and unloaded, and raised again before the train can move.

Further, a rail road car may sometimes be an internal car, with its bridge plates extended to neighbouring cars, and at other times the rail road car may be an "end" car at which the unit train is either (a) split for loading and unloading; (b) coupled to the locomotive; or (c) coupled to another type of rail road car. In each case, the bridge plate at the split does not need to be in an extended "drive-over" position, and should be in a stowed position. Therefore it is advantageous to have a rail car with bridge plates that can remain in position during operation as an internal car in a unit train, and that can also be stowed as necessary when the car is placed in an end or split position.

However, a bridge plate that is to be left in place to span a gap between adjacent releasably coupled vehicle carrying rail road cars while the train is moving must be able to accommodate relative pitch, yaw, roll and slack action motions between the coupler ends of two adjacent cars during travel. For example, when a train travels through a curve, the gap spanned by the bridge plate on the inside of the curve will shorten, and the gap spanned by the bridge plate on the outside of the curve will lengthen. When passing over switches, the coupler ends of adjacent railroad cars may be subject to both angular and transverse displacement relative to each other. All of these displacements are complicated by the need to tolerate slack action. Slack action includes not only the actual slack in the couplers themselves, but also the run-in and run-out of the draft gear, (or sliding sills, or end of car cushioning devices) of successive rail cars in the train. This combination of displacements does not occur at the articulated connectors between units of an articulated rail road car (which are joined at a common, virtually slackless pin), but does occur at the coupler ends. If the vehicle carrying rail road cars have long travel draft gear, such as sliding sills or long travel end of car cushioning (EOCC) units, the potential range of motion that would have to be tolerated by stay-in-place bridge plates at the "drive-over" coupler ends of railroad cars would be quite large relative to the nominal gap to be spanned with the cars at an undeflected equilibrium on straight, flat track.

One approach is to reduce the amount and type of train motion to which stay-in-place bridge plates may be subjected. It is advantageous to reduce the amount of slack in the releasable coupling, as by using a reduced slack or slackless coupler, and to reduce the travel in the draft gear, as by using reduced travel draft gear. In addition, reduction in overall slack action in the train has a direct benefit in improving ride quality, and hence reducing damage to lading.

One way to reduce slack action is to use fewer couplings. To that end, since articulated connectors are slackless, and since the consist of a unit train changes only infrequently, the use of articulated rail road cars significantly reduces the slack action in the train. Some releasable couplings are still necessary, since the consist does sometimes change, and it is necessary to be able to change out a car for repair or maintenance when required.

Reduction in the travel of draft gear or end-of-car cushioning units (EOCC) runs directly counter to the development of draft gear since the 1920's or 1930's. There has been a long history of development of longer travel draft gear to provide lading protection for relatively high value lading requiring gentler handling, in particular automobiles and auto parts, but also farm machinery, or tractors, or highway trailers. There are, or were, a number of factors that led to this tendency. First, if subject to general classification in a switching yard, the vehicle carrying rail road cars could be coupled to other types of car, rather than merely other vehicle carrying cars. As such, they would be subject to slack run-in (i.e., buff) loads imposed by grain cars, gondola cars, box cars, centerbeam cars, and so on. That is, they were exposed to buff loads from cars having the full range of slack of Type-E couplers, and the full range of travel of conventional draft gear. Second, if subject to flat switching, the often less than gentle habits of rail yard personnel might lead to rather high impact loads during coupling.

In such a hostile operating environment, long travel draft gear or long travel EOCC units are the customary means for protecting the more fragile types of lading. Historically, common types of draft gear, such as that complying with, for example, AAR specification M-901-G, have been rated to withstand an impact at 5 m.p.h. (8 km/h) at a coupler force of 500,000 Lb. (roughly $2.2 \times 10^6$ N). Typically, these draft gear have a travel of 2¾ to 3¼ inches in buff before reaching the 500,000 Lb. load, and before "going solid". The term "going solid" refers to the point at which the draft gear exhibits a steep increase in resistance to further displacement. While 3" deflection under 500,000 lbs. buff load may be acceptable for coal or grain, it implies undesirably high levels of acceleration (or deceleration) for more fragile lading, such as automobiles or auto parts. If the impact is sufficiently large to make the draft gear "go solid" then the force transmitted, and the corresponding acceleration imposed on the lading, increases sharply.

Draft gear development has tended to be directed toward providing longer travel on impact to reduce the peak acceleration. In the development of sliding sills, and latterly, hydraulic end of car cushioning units, the same impact is accommodated over 10, 15, or 18 inches of travel. As a result, for example, by the end of the 1960's nearly all auto rack cars, and other types of special freight cars had EOCC units. Further, of the approximately 45,000 auto-rack cars in service in 1997, virtually all were equipped with end of car cushioning units. A brief discussion of the developments of couplers, draft gear and end of car cushioning equipment is provided in the 1997 Car and Locomotive Cyclopedia (Simmons-Boardman Books, Inc., Omaha, 1997 ISBN 0-911382-20-8) at pp. 640–702, with illustrations from various manufacturers. In summary, there has been a long development of long travel draft gear equipment to protect relatively fragile lading from end impact loads.

Given this historical development, it is counter-intuitive to employ short-travel, or ultra short travel, draft gear for carrying wheeled vehicles. However, aside from facilitating the use of stay-in-place coupler end bridge plates, the use of short travel, or ultra-short travel, buff gear has the advantage of eliminating the need for relatively expensive, and relatively complicated EOCC units, and the fittings required to accommodate them. This may tend to permit savings both at the time of manufacture, and savings in maintenance during service.

The original need for slack was related, at least in part, to the difficulty of using a steam locomotive to "lift" (that is, depart from a standing start) a long string of cars, particularly in cold weather, and particularly before the widespread use of roller bearings in freight cars. Steam engines were reciprocating piston engines whose output torque at the drive wheels varied as a function of crank angle. By contrast, presently operating diesel-electric locomotives are capable of producing higher tractive effort from a standing start, without concern about crank angle or wheel angle. For practical purposes, presently available diesel-electric locomotives are capable of lifting a unit train of identical cars having little or no slack.

In that light, it is possible to re-examine the issue of slack action from basic principles. The use of vehicle carrying rail road cars in unit trains that will not be subject to operation with other types of freight cars, that will not be subject to flat switching, and that may not be subject to switching at all when loaded, provides an opportunity to adopt a short travel, reduced slack coupling system throughout the train. The conventional approach has been to adopt end of car equipment with sufficient travel to cope with existing slack accumulation between cars. The opposite approach, as adopted herein, is to avoid the accumulation of slack in the first place. If a large amount of slack is not allowed to build up along the train, then the need for long-travel draft gear and other end of car equipment is also reduced, or, preferably, eliminated. In that light, it would be advantageous to adopt both a short travel draft gear, and a reduced slack, or slackless, coupler, (as compared to AAR Type E). At the same time, adopting such a low-slack, reduced travel, system facilitates provision of stay-in-place coupler end bridge plates, by reducing the range of motion that must be accommodate in service.

Short travel draft gear is presently available. As noted above, most M901-G draft gear "go solid" at an official rating travel of 2¾" to 3¼" of compression under a buff load of 500,000 lbs. Mini-BuffGear, as produced by Miner Enterprises Inc., of 1200 State Street, Geneva Ill., appears to have a displacement of less than 0.7 inches at a buff load of over 700,000 lbs., and a dynamic load capacity of 1.25 million pounds at 1 inch travel. This is nearly an order of magnitude more stiff than some M901-E draft gear. Miner indicates that this "special BuffGear gives drawbar equipped rail cars and trains improved lading protection and train handling", and further, "[The resilience of the Mini-BuffGear] reduces the tendency of the draw bar to bind while negotiating curves. At the same time, the Mini-BuffGear retains a high pre-load to reduce slack action. Elimination of slack between coupler heads, plus Mini-Buff Gear's high pre-load and limited travel, provide ultralow slack coupling for multiple-unit well cars and drawbar connected groups of unit train coal cars." Notably, unlike vehicle carrying rail cars, coal is unlikely to be damaged by the use of short travel draft gear.

In addition to M-901-G draft gear, and Mini-BuffGear, it is also possible to obtain draft gear having less than 1¾ inches of deflection at 450,000 Lbs., one type having about 1.6 inches of deflection at 450,000 Lbs. This is a significant difference from most M-901-G draft gear.

Furthermore, in seeking a low slack, or slackless train, it is desirable to adopt low-slack, or slackless couplings. Although reduced slack AAR Type F couplers have been known since the 1950's, and slackless "tightlock" AAR Type H couplers became an adopted standard type on passenger equipment in 1947, AAR Type E couplers are still predominant. AAR Type H couplers are expensive, and are used for passenger cars, as are the alternate standard Type CS controlled slack couplers. According to the 1997 Cyclopedia, supra, at p. 647 "Although it was anticipated at one time that the F type coupler might replace the E as the standard freight car coupler, the additional cost of the coupler and its components, and of the car structure required to accommodate it, have led to its being used primarily for special applications". One "special application" for F type couplers is in tank cars.

The difference between the nominal ⅜" slack of a Type F coupler and the nominal 25/32" slack of a Type E coupler may seem small in the context of EOCC equipped cars having 10, 15 or 18 inches of travel. By contrast, that difference, 13/32", seems proportionately larger when viewed in the context of the approximately 11/16" buff compression (at 700,000 lbs.) of Mini-BuffGear. It should be noted that there are many different styles of Type E and Type F couplers, whether short or long shank, whether having upper or lower shelves, as described in the Cyclopedia, supra. There is a Type E/F having a Type E coupler head and a Type F shank. There is a Type E50ARE knuckle which reduces slack from 25/32" to 20/32". Type F herein is intended to include all variants of the Type F series, and Type E herein is intended to include all variants of the Type E series having 20/32" of slack or more.

Stay-in-place bridge plates are intended to accommodate the range of travel defined by the combination of coupler and draft gear, given anticipated service loads. While it may be possible to operate telescoping bridge plates, they are relatively less advantageous than monolithic bridge plates. First, a telescoping device may require a more challenging installation procedure if two sliding parts have to be inserted in each other. Second, the telescoping device must be able to telescope, and yet must also be able to support the vertical load carried on the slide. A slide with significant tolerance may not necessarily support bending moments well, may tend to wear under repeated loading, and may cease to slide very well if damaged or bent due to the vertical loads. A monolithic beam has no moving parts requiring careful manufacturing tolerance, and has no moving parts that may deform and jam in service. Slides may accumulate sand and dirt, and may cease to function if water is able to freeze in the slide.

Loading and unloading of highway trailers, or other vehicles in the manner described, above, can also be a relatively tedious and time consuming chore, particularly as the number of railroad cars in the string increases. Persons engaged in such activity may, after some time, perhaps late at night, tend to become less fastidious in their conduct. They may tend to become overconfident in their abilities, and may tend to try to back the highway trailers on to the rail cars rather more quickly than may be prudent. It has been suggested that speeds in the order of 20 km/h have been attempted. In the past, it has been difficult to form bridge plates that lie roughly flush with the deck. Due to their strength requirement, they tend to be about 2 inches thick or more. As a result there is often a significant bump at the bridge plate. Aggressive loading and unloading of the trailers may cause an undesirable impact at the bump, and loss of control of the load. In that regard, it would be advantageous to reduce the height or severity of the bump. It is also advantageous to employ side sills that have a portion, such as the side sill top chord, that extends above the height of the deck and acts as a curb bounding the trackway, or roadway, defined between the side sills. It is also helpful to have flared sill, or curb, ends that may tend to aid in urging highway trailers toward the center of the trackway along the rail cars.

It is sometimes desirable to keep the load in the highway trailer level, to avoid damage to the lading. Movable ramps tend to be relatively steep compared to road grades and fixed loading platforms. Some hostler trucks are able to raise the front end of the highway trailer while backing up the ramp, in an effort to maintain the trailer in a more nearly level orientation. This facilitates the use of the ramp loading method on a siding with relatively little permanent capital investment in loading facilities, and increasing the attractiveness of TOFC operation. However, when highway trailers are parked on the railcar deck, if the railcar deck adjacent to the trailer is too high, the hostler truck at the receiving end may have difficulty picking up the trailer. It is desirable to keep the deck adjacent to the hitch flush As noted above, when highway trailers are circus loaded on a string of railroad flat car units, the landing gear of each highway trailer is cranked down to bear firmly on the deck of the flat car in the event of a collapsible hitch or kingpin failure. The flat car units are not always located next to a convenient platform, and there is not always a generous amount of space available for loading or unloading crew to work on the deck around the trailers to perform the cranking operation. It is not necessarily prudent to stand on the deck of a flat car while highway trailers are being backed into place. It may also take some time to ascend the deck after the highway trailer has stopped moving, to edge along from the ladder to the landing gear, and then to lower (or raise) the landing gear, and then to descend from the car, particularly in bad weather, such as freezing rain.

It would be advantageous to have a ladder abreast of the position of the landing gear, (that is, at a location corresponding to the longitudinal location of the landing gear). Therefore it would be advantageous to have foot supports, and corresponding handholds, mounted to the body of the railcar abreast of the collapsible hitch and landing gear area to facilitate loading and unloading of the highway trailers.

It would also be advantageous to mount running boards longitudinally inboard of the hitch centerline, abreast of the landing gear position, i.e., the location of the landing gear feet of the highway trailers. It may be advantageous to mount the running boards slightly below the level of the main deck, as this may tend to allow a person operating the landing gear crank not to have to bend over as far.

It has been noted that the feet of collapsible hitches, such as are mounted to rail cars used in TOFC trailer operation, sometimes extend into the path of the trailer wheels, and may tend to damage the highway trailer truck tires. It would be advantageous to have a collapsible hitch, such as can be mounted above a center sill, that has a narrower footprint to stay clear of the tires.

Demand for transport by TOFC or by container may fluctuate over time. Therefore it would be advantageous to be able to convert a rail road car from one type of service to the other. To that end it would be advantageous to have a rail road car that has structure for either service, and that permits subsequent conversion as may be desired according to market conditions.

Reference is made herein to shipping containers and various sizes of highway trailers. Shipping containers come in International Standards Association (ISO) sizes, or domestic sizes. The ISO containers are 8'-0" wide, 8'-6" high, and come in a 20'-0" length weighing up to 52,900 Lbs., or a 40'-0" length weighing up to 67,200 Lbs., fully loaded. Domestic containers are 8'-6" wide and 9'-6" high. Their standard lengths are 45', 48', and 53'. All domestic containers have a maximum fully loaded weight of 67,200 Lbs. Some common sizes of highway trailers are, first the 28' pup trailer weighing up to 40,000 Lbs., and the 45' to 53' trailer weighing up to 65,000 Lbs. for a two axle trailer and up to 90,000 Lbs. for a three axle trailer.

SUMMARY OF THE INVENTION

In an aspect of the invention there is a rail road car for carrying wheeled vehicles having a rail road car body supported for rolling motion in a longitudinal direction on rail road tracks. The rail road car body has a deck upon which wheeled vehicles can be conducted. A bridge plate is mounted to the rail road car body. The bridge plate is operable to permit wheeled vehicles to be conducted between the deck and a vehicle deck of a longitudinally adjacent rail road car. The bridge plate is movable to a cross-wise storage position relative to the rail road car body.

In another aspect of the invention there is a rail road car for carrying wheeled vehicles having a rail road car body supported on rail car trucks for rolling motion in a longitudinal direction. The rail road car body has a deck upon which vehicles can be conducted. A bridge plate is mounted to the car body. The bridge plate is movable to a length-wise extended position to engage an adjacent rail road car and to permit vehicles to be conducted between the deck and the adjacent rail road car. The bridge plate is movable to a cross-wise storage position relative to the rail road car body.

In an additional feature of that aspect of the invention, the bridge plate is connected to the rail car body by a pivot fitting. The pivot fitting has a vertical axis about which the bridge plate can move between the extended and storage positions. In another additional feature, the bridge plate has a first end mounted to the rail car body at a first fitting, and a second end locatable distant from the body. The second end has a pair of toes, and a slot defined therebetween for engaging an indexing fitting of another like rail road car for carrying wheeled vehicles. In still another additional feature, the bridge plate has a first end pivotally mounted to the rail car body, and a second end locatable distant therefrom. The second end of the bridge plate has a guideway formed therein for engaging a pivot fitting of another like rail road car for carrying wheeled vehicles.

In a further additional feature, the deck has a first deck end. The rail car body includes a bridge plate supporting member extending longitudinally outboard of the first deck end, and the bridge plate is borne upon the bridge plate supporting member in the cross-wise storage position. In another additional feature, the bridge plate supporting member is a shelf mounted longitudinally outboard of the first end of the deck. In yet another additional feature, the shelf is stepped downward relative to the first end of the deck a step distance, D1. The bridge plate has a depth D2; and D2 differs from D1 by less than one inch.

In still another additional feature of that aspect of the invention, the deck has a first deck end. The rail car body includes a bridge plate supporting member mounted longitudinally outboard of the first deck end. The bridge plate is borne on the bridge plate supporting member in the cross-wise storage position. The bridge plate has a polymeric bearing pad for slidingly engaging the bridge plate supporting member. In still yet another additional feature, a retainer is operable to secure the bridge plate in the cross-wise storage position. In a further additional feature, a transition plate is mounted between the deck and the bridge plate. The transition plate has a surface upon which wheeled vehicles can be conducted between the deck and the bridge plate. In still a further additional feature, the rail road car has a longitudinal centerline. The transition plate is mounted to one side of the longitudinal centerline. The bridge plate is a first bridge plate, and a second transition plate is mounted to the other side of the center line. The second transition plate is operable to engage a second bridge plate placed beside the first bridge plate. In another additional feature, the rail road car has an indexing fitting for constraining the second bridge plate in a position to be engaged by the second transition plate.

In still another additional feature, the rail road car has couplers chosen from the set of couplers consisting of: (a) AAR Type F couplers; (b) AAR Type H couplers; and (c) AAR Type CS couplers. In yet another additional feature, the rail road car has a coupler end. The bridge plate is mounted at the coupler end, and the rail road car has a draft gear mounted at the coupler end. The draft gear has an official rated travel of less than 2½ inches at 500,000 lbs. buff load.

In another aspect of the invention there is a combination comprising a first rail road car for carrying wheeled vehicles and a second rail road car for carrying wheeled vehicles releasably coupled to the first rail road car. At least one bridge plate is mounted to permit wheeled vehicles to be conducted between the first and second rail road cars when the rail road cars are stationary on straight track. The bridge plate includes a rigid beam member of sufficient length to span a gap between said rail road cars when they are stationary on straight, level track. The bridge plate is constrained to remain in a spanning position between the first and second rail road cars while the train is travelling, and, when so constrained, the bridge plate has an angular degree of freedom relative to yawing motion of the first rail road car, an angular degree of freedom with respect to yawing motion of the second rail road car, and a linear degree of freedom accommodating variation of span length between the first and second rail road cars.

In another aspect of the invention there is a combination comprising a first vehicle carrying rail road car and a second vehicle carrying rail road car releasably coupled to the first rail road car. A first bridge plate is mounted to permit wheeled vehicles to be conducted between the first and second rail road cars when the rail road cars are stationary on straight track. The bridge plate is connected to the first rail road car at a first pivot mounting. The bridge plate is connected to the second rail road car at a second pivot mounting. The bridge plate has a linear extension member operable to tolerate variation in distance between the first and second pivot mountings while the rail road cars are in motion. The bridge plate is constrained to remain in a spanning position between the first and second rail road cars while the rail road cars are travelling as part of a train, and, when so constrained. The bridge plate has an angular degree of freedom at the first pivot mounting relative to yawing motion of the first rail road car, an angular degree of freedom at the second pivot mounting with respect to yawing motion of the second rail road car, and a linear degree of freedom provided by the linear extension member to accommodate varying span length between the first and second rail road cars.

In an additional feature of that aspect of the invention, a second bridge plate is mounted beside the first plate, whereby the bridge plates co-operate to define side-by-side wheel ways. In another additional feature, the second pivot mounting includes a hinge pin mounted to the second rail road car, and the linear expansion member is a guideway engaged with the pin and linearly movable relative thereto. In still another additional feature, the bridge plate is pivotally movable about the first pivot mounting to a cross-wise storage position relative to the first rail road car.

In yet another additional feature, a second bridge plate is mounted beside the first bridge plate. The first and second bridge plates are co-operable to define a pair of side-by-side wheel ways. The second bridge plate is connected to the second rail road car at a third pivot mounting. The second bridge plate is connected to the first rail road car at a fourth pivot mounting. The second bridge plate has a second linear extension member operable to tolerate variation in distance between the first and second pivot mountings while the rail road cars are in motion. When the rail road cars are uncoupled, the first bridge plate is pivotally movable about the first pivot mounting to a cross-wise storage position relative to the first rail road car. The second bridge plate is pivotally movable about the third pivot mounting to a cross-wise storage position relative to the second rail road car.

In a further additional feature, the first rail road car has a first releasable coupler. The second rail road car has a second releasable coupler. The first and second couplers are joinable to form a coupling. The coupling has less than 25/32 inches of slack. In still yet another additional feature, the coupling has up to ⅜ inches of slack. In a further additional feature, both of the couplers are slackless couplers.

In yet a further additional feature, the first rail road car has a first draft gear mounted thereto, and a first coupler mounted to the first draft gear. The second rail road car has a second draft gear mounted thereto, and a second coupler mounted to the second draft gear. The first and second couplers are releasably coupled together. At least one of the draft gear has less than 2½ inches of travel at 500,000 lbs.

In still yet a further additional feature, each of the draft gear has less than 2½ inches of travel. In another additional feature, at least one of the draft gear has a travel of less than 1.00 inches at 700,000 lbs. load. In still another additional feature, both of the draft gear are Mini-BuffGear.

BRIEF DESCRIPTION OF THE DRAWINGS

FIG. 1a shows a conceptual side view of a train having several articulated vehicle carrying rail road cars, in an unloaded condition;

FIG. 1b shows a portion of the train of FIG. 1a as split for loading;

FIG. 1c shows the train portion of FIG. 1a in a split configuration ready for loading;

FIG. 1d shows the train portion of FIG. 1a in a partially loaded condition;

FIG. 1e shows the train portion of FIG. 1a in a fully loaded condition;

FIG. 1f shows portions of the train of FIG. 1a in an assembled condition;

FIG. 2a shows a side view of a five-pack articulated railroad car for carrying highway trailers as loaded;

FIG. 2b shows a top view of the five pack articulated rail road car of FIG. 2a in an unloaded condition;

FIG. 2c shows a side view of the rail road car of FIG. 2a in an unloaded condition;

FIG. 3b shows a top view of the articulated rail road unit car of FIG. 3a;

FIG. 3c shows a side view of the articulated rail car unit of FIG. 3a;

FIG. 3d shows an underside view of the rail road car unit of FIG. 3a;

FIG. 3e shows an end view of the articulated rail road car unit of FIG. 3a;

FIG. 3f shows a mid-span cross-section of the rail road car unit of FIG. 3a;

FIG. 3h shows an enlarged top detail of the rail car unit of FIG. 3a;

FIG. 4a shows a top view of a bridge plate for the rail car unit of FIG. 3a;

FIG. 4b shows a side view of the bridge plate of FIG. 4a;

FIG. 4c shows an end view of the bridge plate of FIG. 4a;

FIG. 4d shows a section of the bridge plate of FIG. 4a taken on '4d—4d';

FIG. 4e shows a section of the bridge plate of FIG. 4a taken on '4e—4e';

FIG. 5a is a partial isometric view of the bridge plate of FIG. 4a in an extended position relative to the rail car unit of FIG. 3a;

FIG. 5b is a partial isometric view of the bridge plate of FIG. 4a in a stored position relative to the rail car unit of FIG. 3a;

FIG. 6a is an isometric view of a transition bridge plate for the rail car unit of FIG. 3a;

FIG. 6b is a top view of the transition bridge plate of FIG. 6a;

FIG. 6c is a side view of the transition bridge plate of FIG. 6a;

FIG. 7a is an isometric view of a cam crank of the rail car unit of FIG. 3a;

FIG. 7b is a side view of the cam crank of FIG. 7a;

FIG. 7c is an end view of the cam crank of FIG. 7a;

FIG. 7d is a cross-section of the cam crank of FIG. 7a taken on '7d—7d';

FIG. 7e is a view of the cam crank of FIG. 7a taken on arrow '7e';

FIG. 8a shows a partial side sectional view of two rail road cars having bridge plates, as shown in FIG. 7a, in a separated position;

FIG. 8b shows the rail road cars of FIG. 8a in an approach position;

FIG. 8c shows the rail cars of FIG. 8a as one bridge plate meets a cam crank;

FIG. 8d shows the rail cars of FIG. 8a in a coupled relationship;

FIG. 8e shows the rail road cars of FIG. 8a in an alternate approach position to that of FIG. 8b;

FIG. 8f shows the rail cars of FIG. 8e as one bridge plate meets a cam crank;

FIG. 9b shows an isometric view of an articulation connection end bridge plate for the rail road car of FIG. 9a;

FIG. 10b shows a top view of the articulated rail road unit car of FIG. 10a;

FIG. 10c shows a side view of the articulated rail car unit of FIG. 10a;

FIG. 10d shows an underside view of the rail road car unit of FIG. 10a;

FIG. 11b shows a top view of the articulated rail road unit car of FIG. 11a;

FIG. 11c shows a side view of the articulated rail car unit of FIG. 11a;

FIG. 11d shows an underside view of the rail road car unit of FIG. 11a;

FIG. 12a shows a top view of the draft gear at the coupler end of the articulated rail road car of FIG. 3a;

FIG. 12b shows a sectional of the draft gear of FIG. 12a taken on '12b—12b';

FIG. 13 shows an alternate side sill assembly for a rail car unit such as shown in FIG. 3a;

FIG. 14a shows an end view of a hitch assembly such as shown in FIG. 3a, in a raised position;

FIG. 14b shows the end view of FIG. 14a with the hitch in a lowered position and a highway trailer rolling thereover; and FIG. 14c shows the end view of FIG. 14a with the hitch in a lowered position and a highway trailer rolling eccentrically thereby;

FIG. 15a shows an isometric view of a dual purpose cross-beam of the articulated rail car unit of FIG. 3a;

FIG. 15b shows a top view of the dual purpose cross-beam of FIG. 15a;

FIG. 15c shows an end view of the dual purpose cross-beam of FIG. 15a; and

FIG. 15d shows the cross-beam of FIG. 15b viewed on section '15d—15d'.

DETAILED DESCRIPTION OF THE INVENTION

Figure 3A:
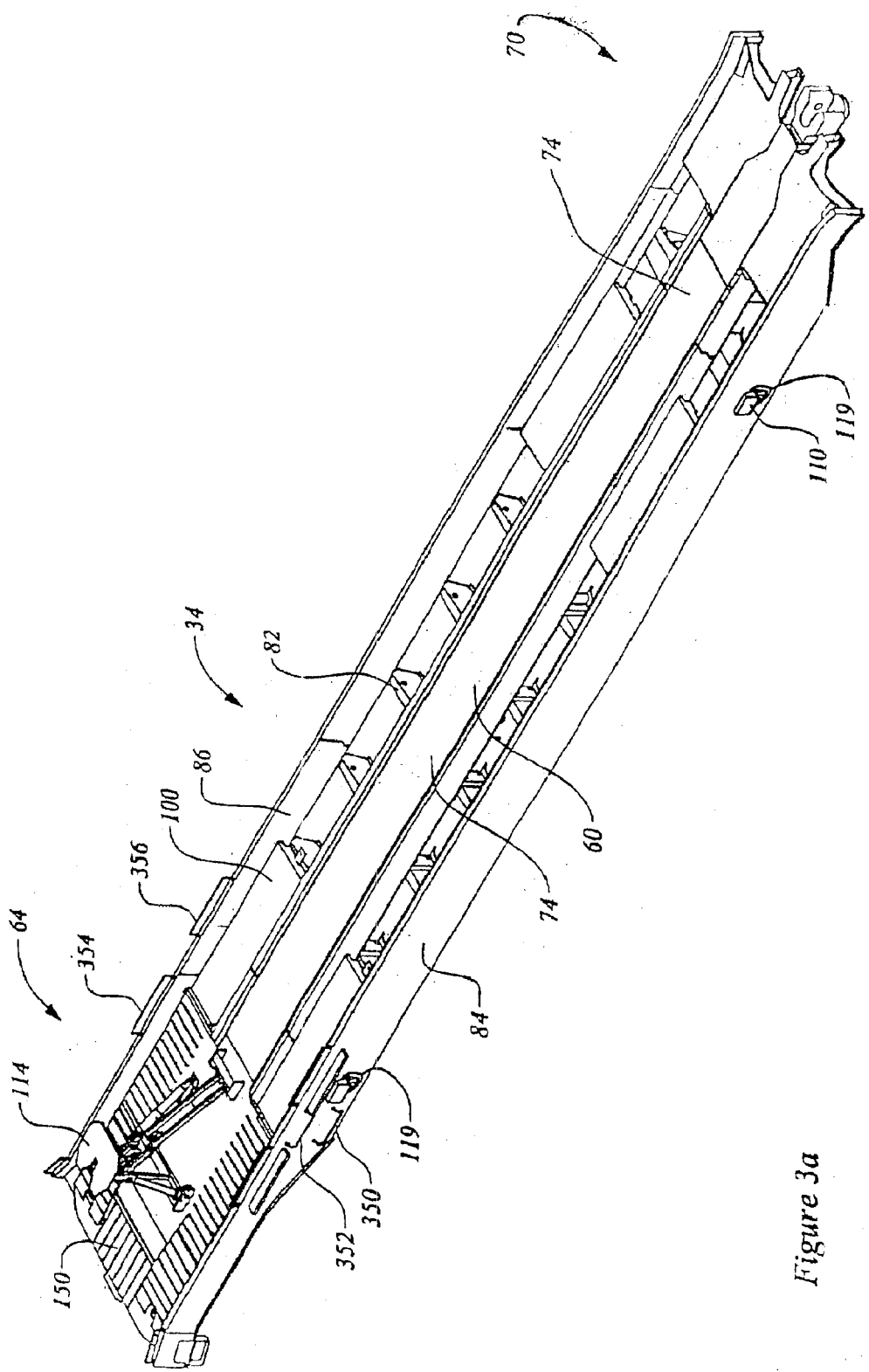
FIG. 3a shows an isometric view of a "B-End" unit of an articulated rail road car such as shown in either FIG. 1a or FIG. 2a, with middle floor deck plates removed for clarity.
Figures 3B, 3C, 3D:
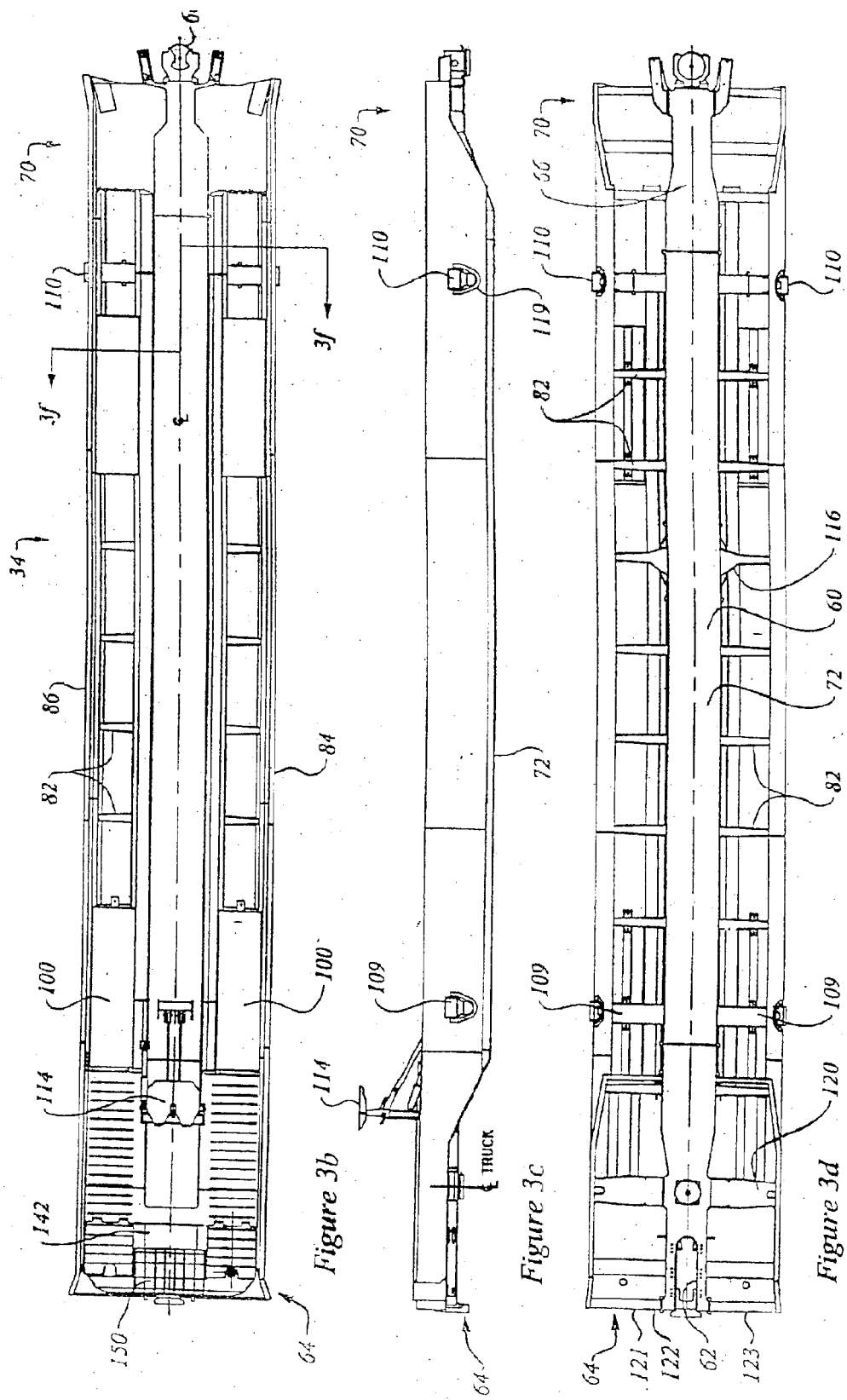
Figure 3E:
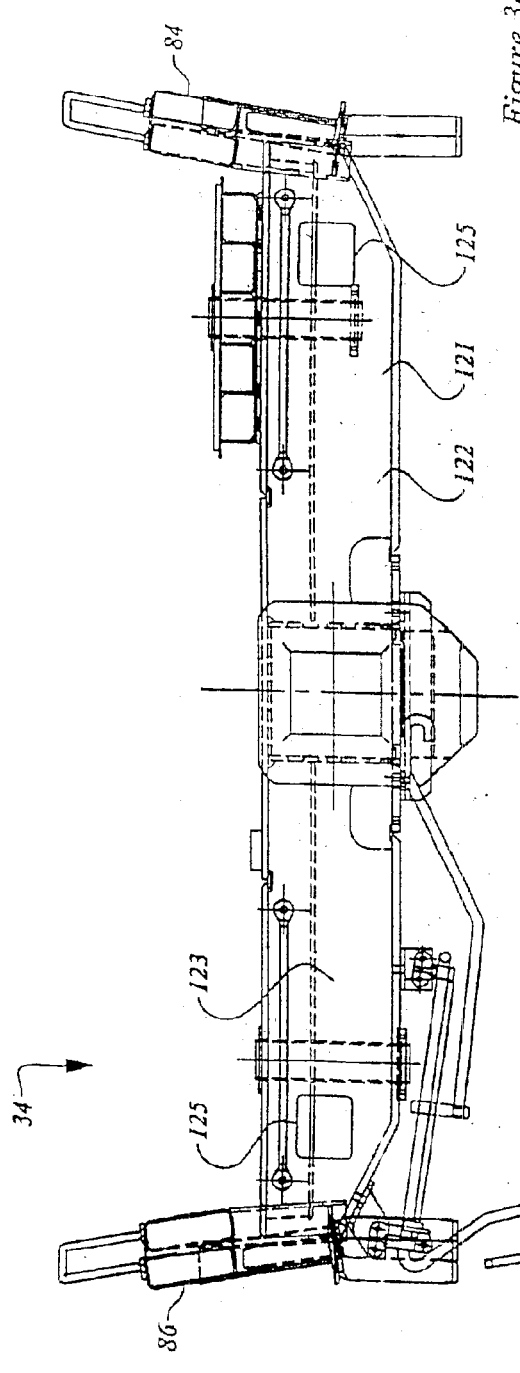

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

In terms of general orientation and directional nomenclature, for each of the rail road cars described herein, the longitudinal direction is defined as being coincident with the rolling direction of the car, or car unit, when located on tangent (that is, straight) track. In the case of a car having a center sill, whether a through center sill or stub sill, the longitudinal direction is parallel to the center sill, and parallel to the side sills, if any. Unless otherwise noted, vertical, or upward and downward, are terms that use top of rail, TOR, as a datum. The term lateral, or laterally outboard, refers to a distance or orientation relative to the longitudinal centerline of the railroad car, or car unit, indicated as CL—Rail Car. The term "longitudinally inboard", or "longitudinally outboard" is a distance taken relative to a mid-span lateral section of the car, or car unit. Pitching motion is angular motion of a rail car unit about a horizontal axis perpendicular to the longitudinal direction. Yawing is angular motion about a vertical axis. Roll is angular motion about the longitudinal axis.

Figure 5A:
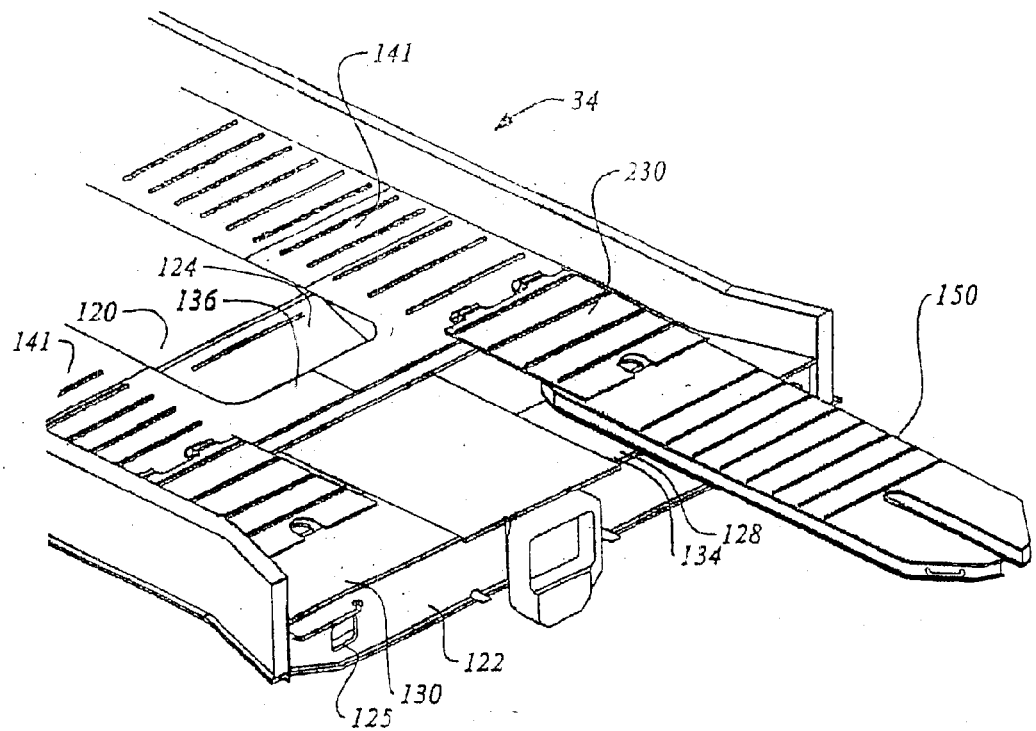
Figure 5B:
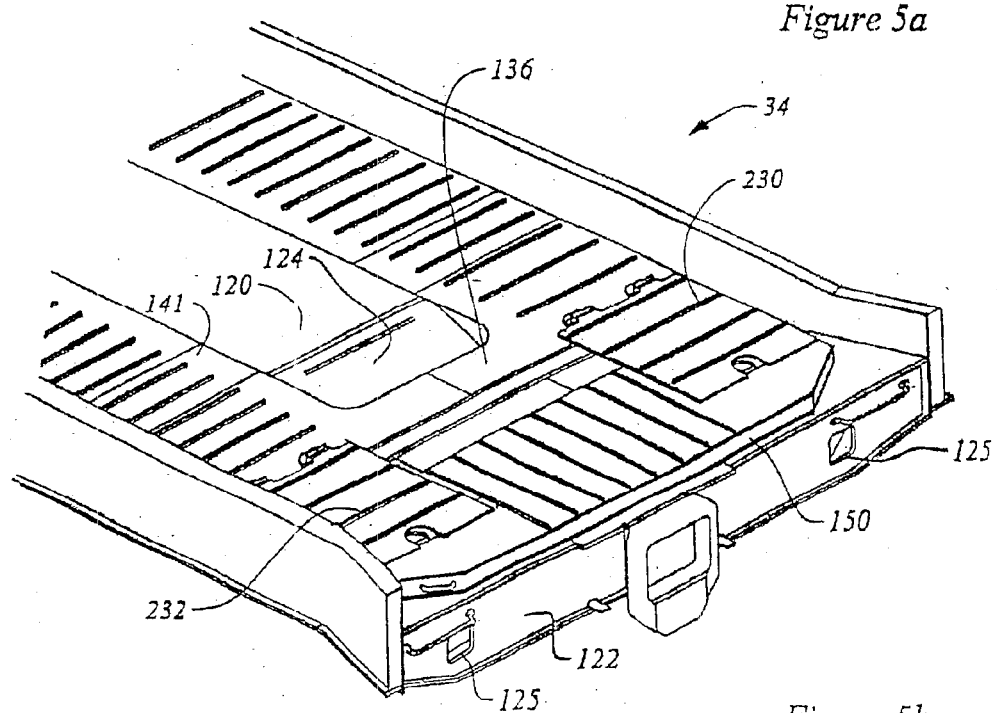

By way of general overview, FIGS. 1a to 1f illustrate the process of loading wheeled vehicles onto a train of multi-unit articulated railroad cars. In this example, an assembled train of articulated rail road cars, indicted generally as 20, includes a string of three-pack articulated railroad cars 21, 22, 23 and 24 joined together with a two rail car unit articulated rail road car 25, drawn by a locomotive indicated as 38. Train 20 travels in a longitudinal direction toward its destination. While train 20 is travelling, bridge plates 150 (described more fully below) remain extended in a lengthwise (i.e., longitudinal) "drive-over" orientation, such as shown in FIG. 5a below, to span the gap at the releasable coupling between the decks of the adjacent rail car units of rail road car 21 and rail road car 22, as well as between rail road cars 23 and 24, 24 and 25. At the coupled connection between rail road cars 22 and 23, bridge plates 150 do not extend lengthwise but are disposed in a stowed, cross-wise orientation, transverse to the longitudinal centerlines of the rail road cars, as shown in FIG. 5b below. Likewise, at the ends of the string of vehicle carrying rail road cars, such as adjacent locomotive 38, at the end of train location, (or, in another context, at a car coupled to a different type of freight car), bridge plates 150 are also placed in their stowed position, as in FIG. 5b. It is preferred that train 20 be a unit train composed of vehicle carrying rail road cars, and not coupled to any other type of car.

In the second, enlarged, partial view of FIG. 1b, train 20 has arrived at its destination, and a rear portion 27 of train 20 has been spotted at a first location, while another, more forward portion 29 has been spotted further along the track. The two portions are separated by a few hundred feet. Train 20 has been split at the releasable coupling between the rear end unit of rail road car 22 and the forward end unit of rail road car 23. In the separated position of FIGS. 1b, 1c, 1d, and 1e, the cross-wise stowed orientation of the bridge plates at the opposing ends of rail road cars 22 and 23 facilitates use of movable ramps 59 for loading, or unloading, of train 20. As shown in the succession of views of FIGS. 1c, 1d, 1e and 1f, hostler trucks 40 are used to move ramps 59 into place adjacent the split, (i.e., uncoupled), ends of rail road cars 22 and 23, and are then used to back wheeled vehicles, in this instance highway trailers 42, into place, each highway trailer 42 facing the split, with its king pin engaging the hitch plate of a collapsible hitch 112 or 114 (see below), and its landing gear cranked firmly down. (Other types of wheeled vehicles, whether automobiles, trucks, farm machinery, or buses could be loaded in a similar manner, with or without a towing tractor, as may be suitable). At the internal ends of rail road cars 21, 22, 23, 24, and 25, the length-wise extended bridge plates make those ends "drive-over" ends that permit highway trailers to be conducted along a continuous path between cars.

When all of the rail car units have been loaded, train 20 is ready. The split, (or splits, as the case may be) can be closed by gently shunting the forward and rearward portions 29 and 27 together. Train 20 is then ready to depart for its next destination. In the example train 20 arrives empty. However, it would be customary for the loading procedure described to have been preceded by an unloading procedure for highway trailer units arriving from the previous depot, as by reversing the steps of FIGS. 1e, 1d, 1c and 1b.

Describing elements of train 20 in greater detail, coupled units 22 and 23 have respective first, or "drive over" end units 26, and 28, intermediate articulated units 30 and 32, and coupled end units 34 and 36. For the purposes of this description, it can be taken that units 26 and 28 are the same, units 30 and 32 are the same, and units 34 and 36 are the same, but facing in opposite directions. Each of the rail car units having a coupler end, namely units 26 and 28, 34 and 36, has an end truck, 35, mounted under a main bolster at the coupler end, whichever end it may be. Rail car units 26 and 30, 30 and 34, 36 and 32, and 32 and 28 are joined together by articulated connectors indicated generally as 37, mounted over respective shared articulated connection trucks 39. Rail car units 34 and 36 are connected by releasable couplers 44 and 46. Articulated connector bridge plates 300 (whether left or right handed, as described below) span the gaps between rail car units 26 and 30, 30 and 34, 36 and 32, and 32 and 28. With the aid of articulated connector bridge plates 300, and movable bridge plates 150, to one side of the split between rail road cars 22 and 23, decks 47, 48, 49, 50, 51, and 52, (and to the other side, 47, 48, 49, 50, 51, 52, 53 and 54) form continuous pathways, or roadways, upon which vehicles can be conducted in either forward, driving, direction or a reverse, backward direction. If additional railroad cars are joined at the opposite ends of railroad cars 22 and 23, further bridge plates can be employed to extend the length of the pathway.

For the purposes of this description, although FIGS. 1a, 1b, 1c, 1d, 1e, and 1f show a locomotive and three-pack or two-pack articulated cars, other combinations of articulated cars having any reasonable number of articulation units can be employed. 2-unit, 3-unit, and 5-unit articulated packs are relatively common. It will be understood that the example of FIGS. 1a–1f is meant symbolically to represent a train of any suitable length. Typically, a unit train would include a much larger number of cars units, such as 60 or 80 rail car units composed of a multiplicity of 2, 3, 5 or 6 (or more) unit articulated cars strung together. Such a train can be directed onto a siding, with successive portions of the string spotted at different locations along the siding, leaving gaps of, typically, 200 or 300 feet between sections to permit the placement of ramps as may be suitable. When the cars are loaded, the ramps are removed. The locomotive can then reverse, closing each successive gap and permitting the rail road cars to be reconnected at their respective coupler ends.

In the example shown, end rail car units 26 of rail road car 21, and 28 of rail road car 25, each have a movable bridge plate 150 carried at their uncoupled ends (in the case of rail car unit 26, the "uncoupled end" is actually coupled to locomotive 38, the context of "uncoupled" meaning an end that is not coupled to another similar rail car for carrying vehicles to which a bridge plate would be extended). If a larger train were assembled, the uncoupled ends of car units 26 and 28 would be coupled to mating ends of other articulated cars. When additional cars are joined, the collapsible hitches are oriented in the same direction, namely, all facing toward the location of the split. Thus, away from the split, a car unit 26 would mate with a car unit like car unit 34, and so on. In a long train there would tend to be more than one split.

For the purposes of illustration, rail road car 22, which includes rail car units 26, 30, and 34 will be described in greater detail. It will be appreciated that a two-unit articulated rail road car, such as rail road car 25, can be assembled by joining units 26 and 34 directly together, and that, in general, articulated rail cars of varying lengths can be assembled from a pair of ends units, such as units 26 and 34, and any chosen number of intermediate units (i.e., cars not having coupler ends) such as unit 30. A five-pack assembled in this way is shown loaded in FIG. 2a, and unloaded in FIGS. 2b and 2c. For the purposes of this description, unit 26 is arbitrarily designated as the "A-End" unit, unit 34 is the "B-End" unit, and unit 30 is the "C", or intermediate unit. In rail road terminology the "B" end of a rail road car is the handbrake end, or predominant hand brake end. When several "C" units are employed in a multi-unit articulated rail road car, as in the five pack of FIGS. 2a, 2b and 2c, each may be referred to as the "C", "D", or "E" unit (and so on if more units are used). There are minor structural differences between the intermediate units, such as whether one hitch is provided or two, and corresponding cross-bearer and deck web reinforcements. For the purposes of this structural description any intermediate car unit will be referred to as a "C" unit, and unit 30 will be taken as representative of intermediate units in general, whatever their hitch layout may be.

The second end unit (the "B" unit) 34 is shown in FIGS. 3a, (isometric, with decking partially removed to reveal deck supporting structure), 3b (side) 3c (top view, with decking partially removed to reveal structure) 3d (underframe) and 3e (coupler end view). Car unit 34 has a main longitudinal structural member in the nature of a main center sill 60 having a draft pocket 62 at one end (i.e., the "coupler end" portion, 64 of unit 34), and an articulated connector socket in the nature of a rectangular fabricated steel box 66 into which one half of an articulated connector 68 is mounted at the other end (i.e., the articulated connection end portion, 70 of car unit 34). In between the coupler end portion 66 and the articulated end portion 70 is a central portion, 72, being the mid-span portion of the car between its trucks.

Figure 3F:
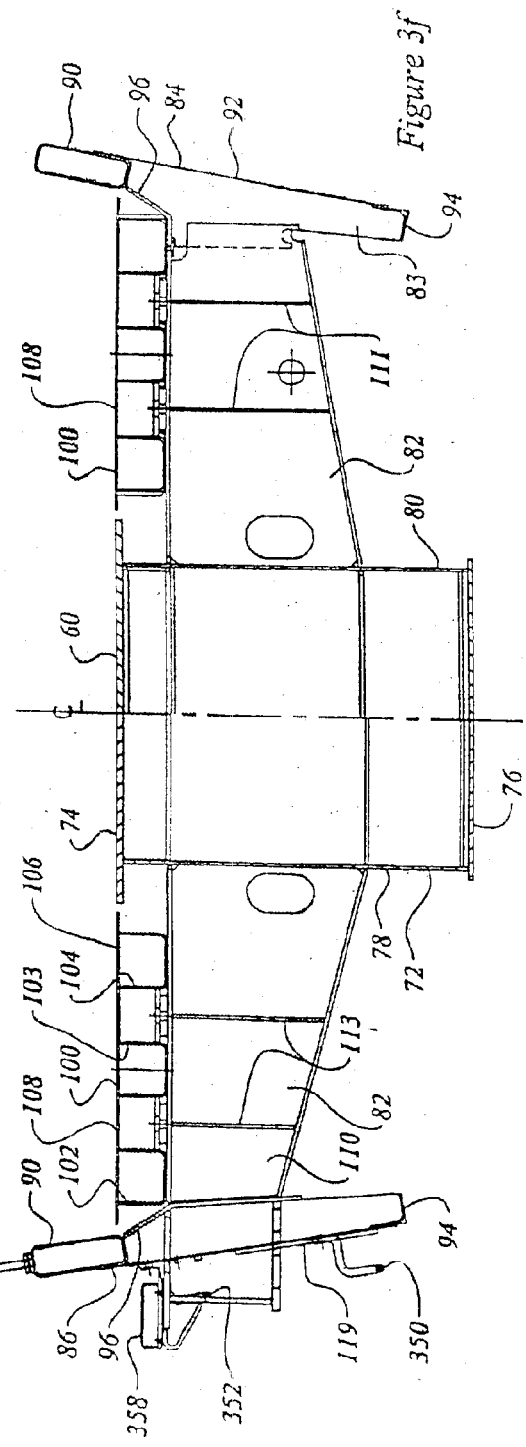

As shown in the offset section of FIG. 3f, over the central portion 72, of unit 34 center sill 60 has the form of a hollow beam having a top flange 74, a bottom flange 76, and a pair of spaced apart vertical webs 78, 80. A set of cross-bearers 82 extend outwardly from roots at the side webs of center sill 60 to laterally outboard ends that meet in lap welded joints with vertical gussets 83 of meet side sills 84 and 86. Each of side sills 84 and 86 has a hollow rectangular top chord member 90, an outer cowling sheet, or web 92, a bottom chord in the form of an angle 94, and a cross-bearer flange extension 96 in the form of a bent member welded to the inner face of top chord member 90 in a downwardly hanging position, the upward portion, or leg of extension 96 lying on the same slope as the top chord web, the inwardly extending portion, or leg, of extension 96 lying roughly horizontally to provide a lip that is welded to the top flange of the cross-bearer.

Floor panels 100 span the pitches between cross-bearers 84, to provide a continuous pathway from one end of the car to the other. Each floor panel 100 is formed from a series of spaced apart, longitudinally extending channels 102, 103, 104 surmounted by a top sheet, or flange 106 whose upper surface 108 forms a path for the wheels of vehicles loaded on the car unit. Upper surface 108 is roughly flush with top flange 74 of center sill 60, and floor panels 100 and top flange 74 co-operate to form deck 47 of rail car unit 34. Side sills 84 and 86, run along the sides of deck 47. Top chord member 90 of each of side sills 84 and 86 extends well above the level of top surface 108, and serves as a curb to encourage trailers to stay on the trackway, or roadway, defined on deck 47 between top chord members 90, as they are backed along the rail car unit.

Each of side sills 84 and 86 is canted inwardly, such that its lower extremity, or toe, is nearer to the rail car longitudinal centerline than the top chord. The inward cant of top chord member 90 of side sills 84 and 86 gives this curb an angle or chamfer, as shown in FIG. 3f, such that a truck tire must ride up the slope before it can escape, the chamfer yielding a self-centering effect as the tires try to ride along it. Although only a few floor panels 100 are shown, it will be appreciated that floor panels 100 are located continuously to permit vehicles to be driven over the car units, as in FIG. 2b.

At either end of the central portion of car unit 34, there are dual purpose cross-beams 109, 110 located at longitudinal stations corresponding to the 40 ft container pedestal locations of a container carrying rail car. Cross-beam 110 is shown in greater detail in FIGS. 15a to 15d. These dual purpose cross-bearers have a rectangular box section, having fore and aft webs 105, 107, a top flange 115, and an inclined bottom flange 117. Cross-beams 109, 110 perform as cross-bearers generally, but also permit lifting of one end or the other of car unit 34 during maintenance (such as truck replacement). Cross beams 109 and 110 also permit the removal of floor panels 100 and installation of container support pedestals if it is desired to convert car unit 34 to container carrying service rather than TOFC service, and as such are capable of supporting a fully loaded 40' ISO or 45', 48' or 53' domestic container. Cross-bearers 82, and dual purpose cross-beams 109, 110 have respective intermediate webs 111, 113 to discourage deflection of the upper cross-bearer flange at the location of application of the floor panel loads, or, additionally, in the case of cross-bearers 110, container pedestal loads. Cross-bearers 109, 110 have upwardly and downwardly extending gussets 99, 101 that mate with web 92 or side sill 84 (or 86), and a distal tip 97 that extends proud of side sills 84 (or 86) to provide a jacking point fitting 98 at these locations. This facilitates lifting of end portion 70 during, for example, repair, maintenance or replacement of shared truck 39. Web 92 has a V-shaped external reinforcement doubler plate 119 at this location.

A first collapsible hitch 112 is also mounted to top flange 74 of center sill 60 in a mid span position for engaging a 28' pup-trailer, if required. A second collapsible hitch 114 is mounted roughly 4 inches inboard from the truck center, CL Truck, at coupler end, end portion 64. The cross-bearer flanges are reinforced under the hitch locations, as shown at 116.

At the coupler end, end portion 64, main center sill 60 of rail car unit 34 becomes shallower, the bottom flange being stepped upwardly to a height suitable for being supported on truck 35. Side sills 84 and 86 also become shallower as the bottom flange curves upward to clear truck 35. Rail car unit 34 has a laterally extending main bolster 120 at the longitudinal station of the truck center (CL Truck), and a parallel, laterally extending end sill 122 having left and right hand arms 121, 123 extending laterally between the coupler pocket and the side sills. In their distal, or outboard regions, arms 121 and 123 have ramp engagement sockets 125 in the nature of rectangular apertures, with which prongs 127 of ramp 59 can be engaged to align ramp 59 with car unit 34 for loading.

Figure 7F:
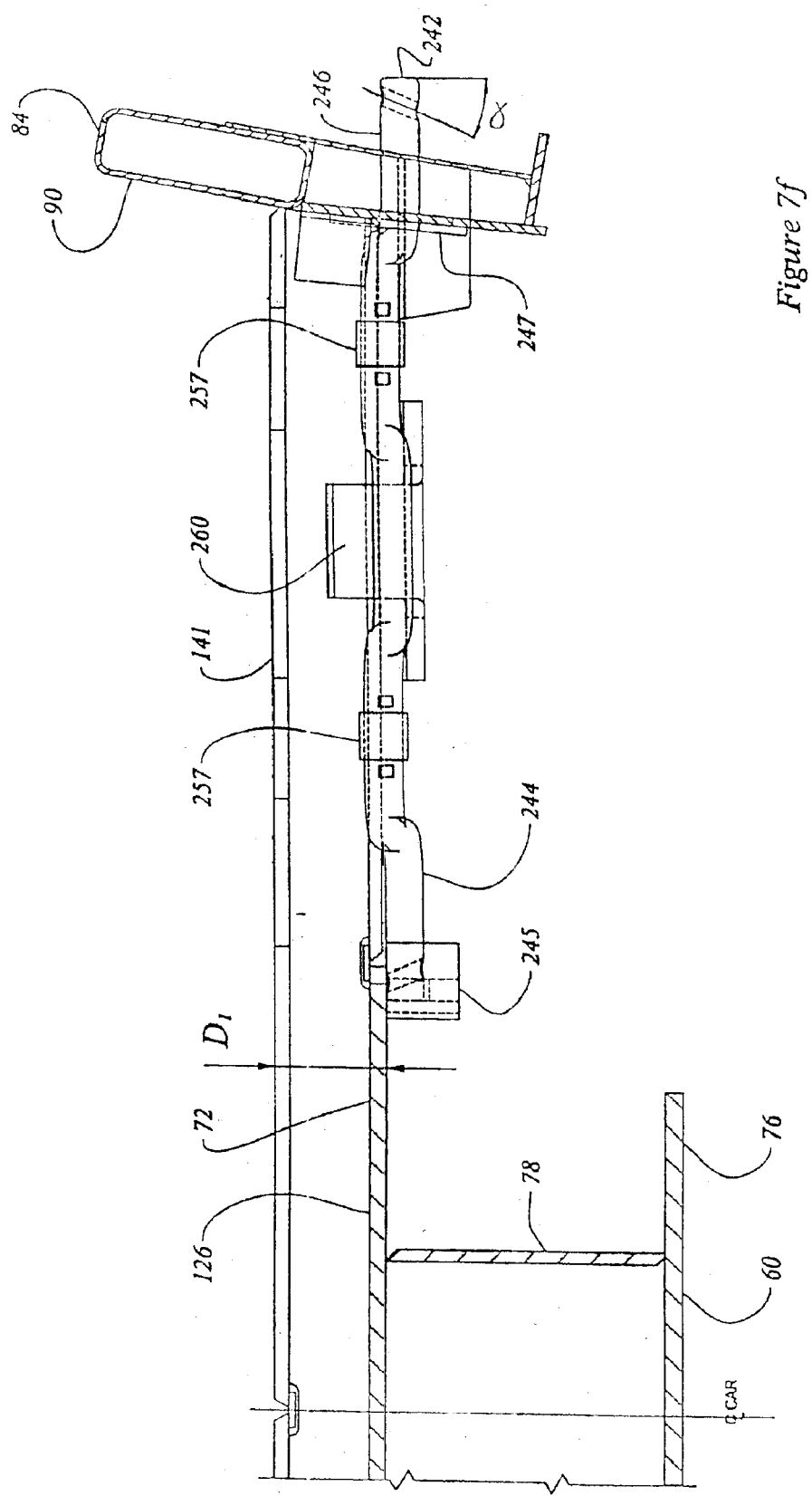
FIG. 7f shows a partial cross-section of the rail car unit of FIG. 3a taken on '7f—7f' showing the cam crank of FIG. 7a installed.
Figure 7G:
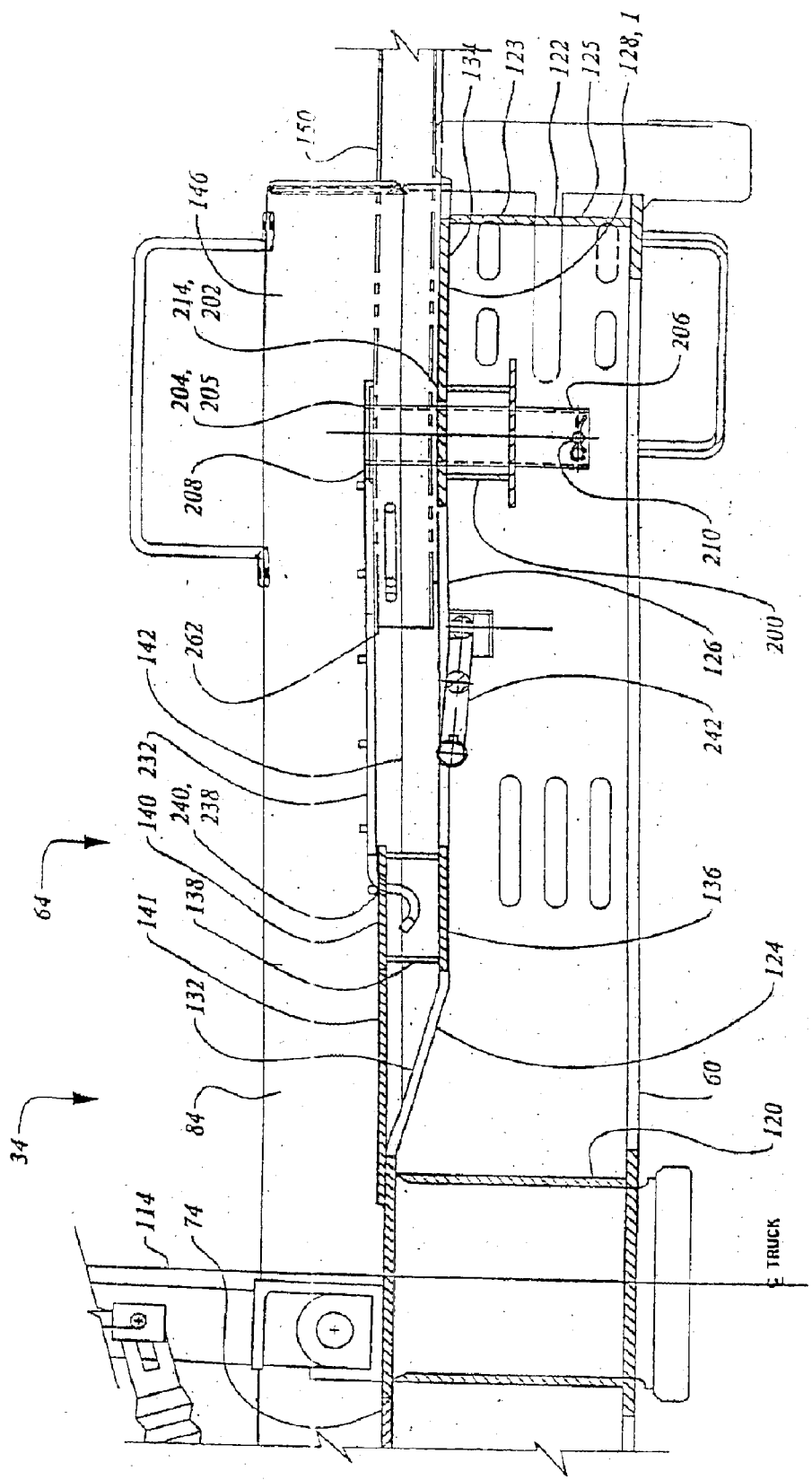
FIG. 7g shows a partial sectional view across the rail car unit of FIG. 3a with the cam crank of FIG. 7a installed.

As shown in FIG. 7g, top flange 74 of center sill 60 has a downwardly sloping transition 124 longitudinally outboard of main bolster 120, and a level, horizontally extending portion 126 lying outboard thereof, such that the end portion of center sill 60 is stepped downward relative to the main portion of top flange 74 inboard of bolster 120. A bridge plate support member, in the nature of an outboard horizontal shelf portion 134, includes left and right hand plates 128, 130 that form upper flanges for, and extend longitudinally inboard of, arms 121 and 123 of end sill 122 to define bridge plate support members.

A laterally extending structural member, in the nature of a fabricated closed beam 136 is welded to horizontal portion 126 of center sill 60 between side sills 84 and 86. Beam 136 has vertical legs 138 extending upwardly of portion 126 and a horizontal back 140, lying flush with the level of top flange 74 at the longitudinal location of main bolster 120. Left and right hand deck plates 141 are welded to back 140 and extend above tapered portion 130 to terminate at main bolster 120.

Plates 128 and 130 are flush with downwardly stepped horizontal portion 126 of top flange 74, and co-operate with portion 126 to define a continuous shelf across (i.e., extending cross-wise relative to) the end of rail car unit 34, outboard of the end of deck 47 defined by the longitudinally outboard edge of beam 136. In this way a step, depression, shelf, or rebate, or recess 142 for accommodating (or for receiving) a bridge plate, is formed in the end of rail car unit 34 adjacent to the coupler 144, upon which bridge plate 150 can rest, as described below.

Figure 3G:
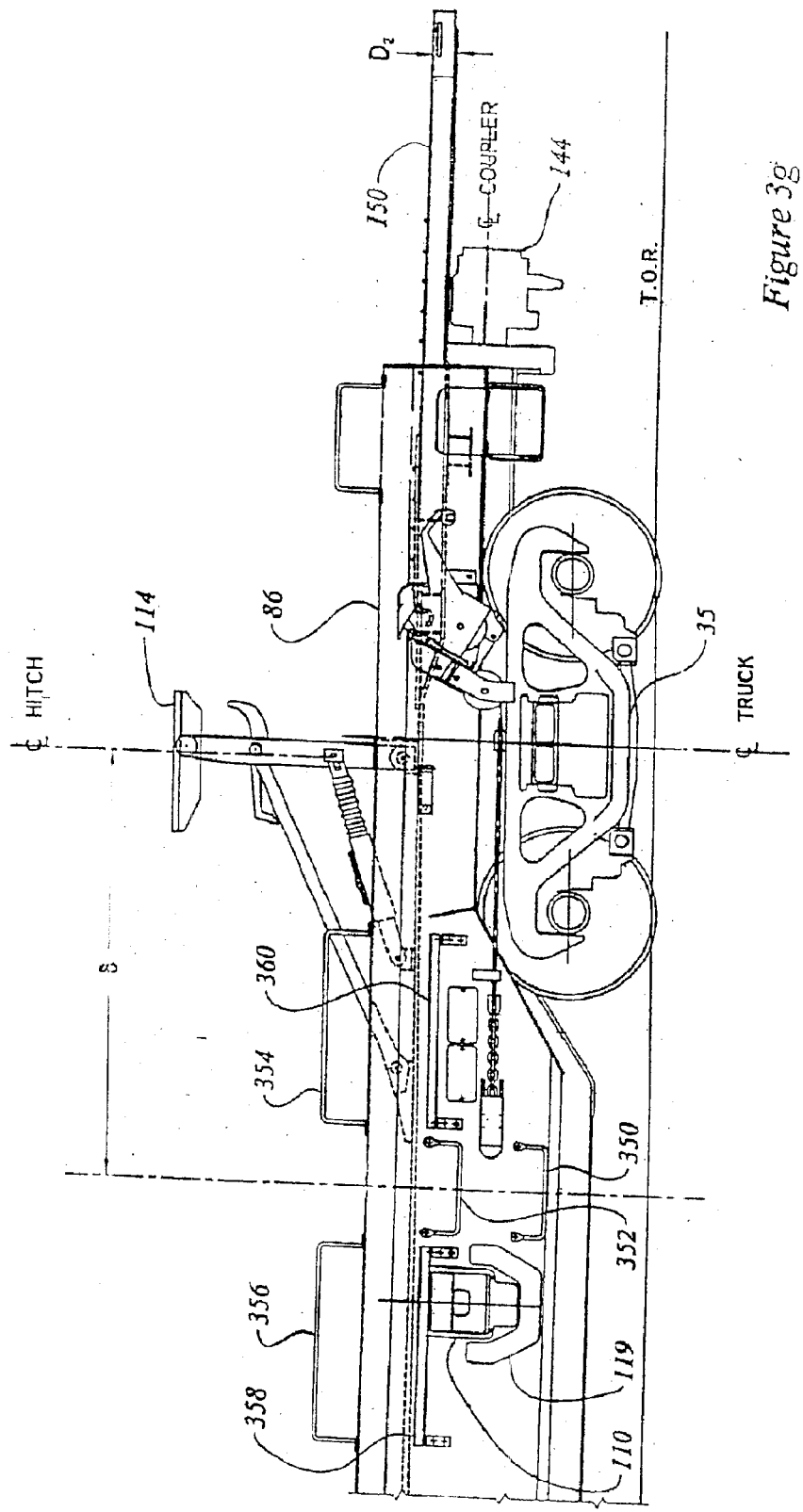
FIG. 3g shows an enlarged side detail of the rail car unit of FIG. 3a at the coupler end of the car.
Figure 3H:
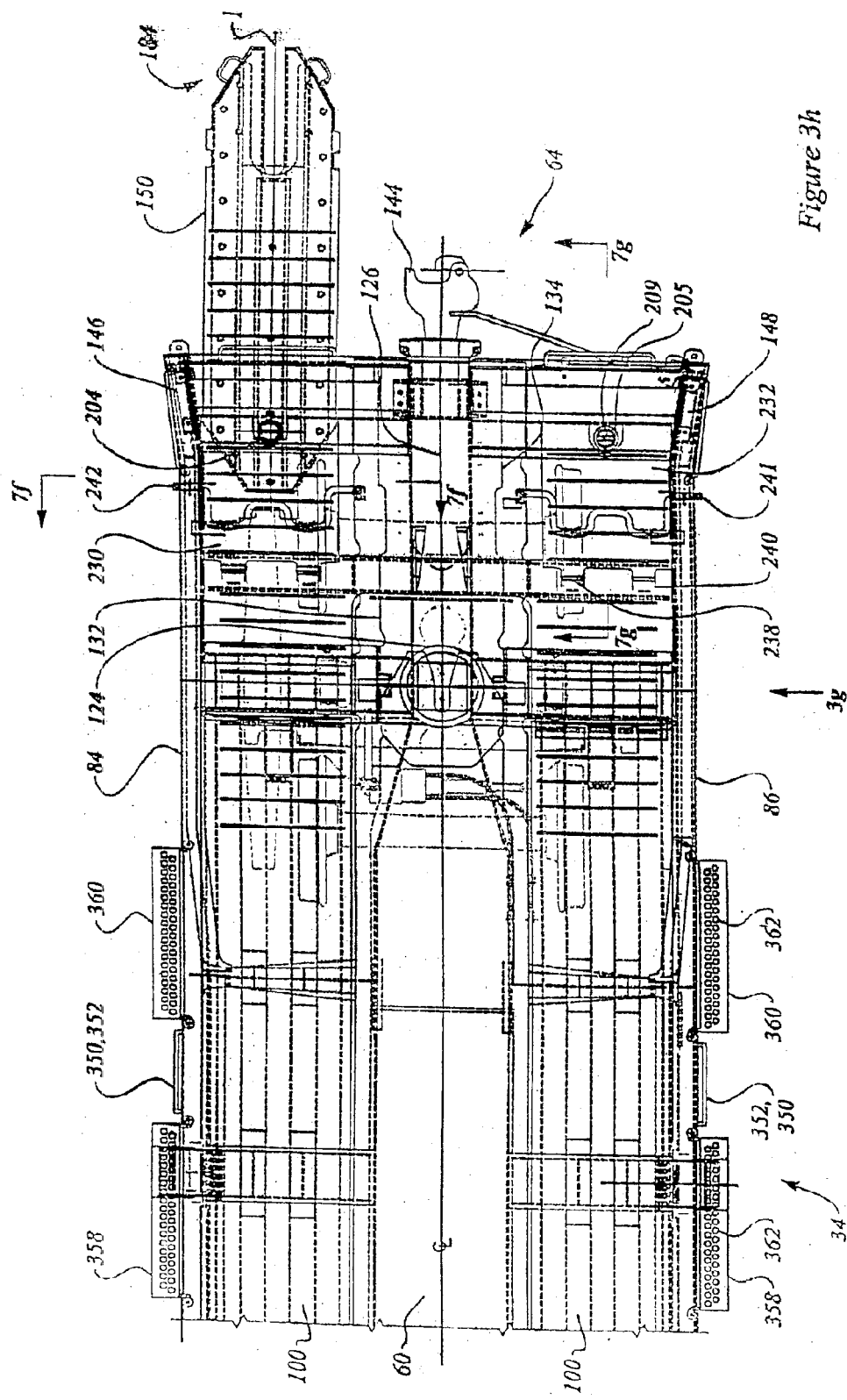
Figure 5C:
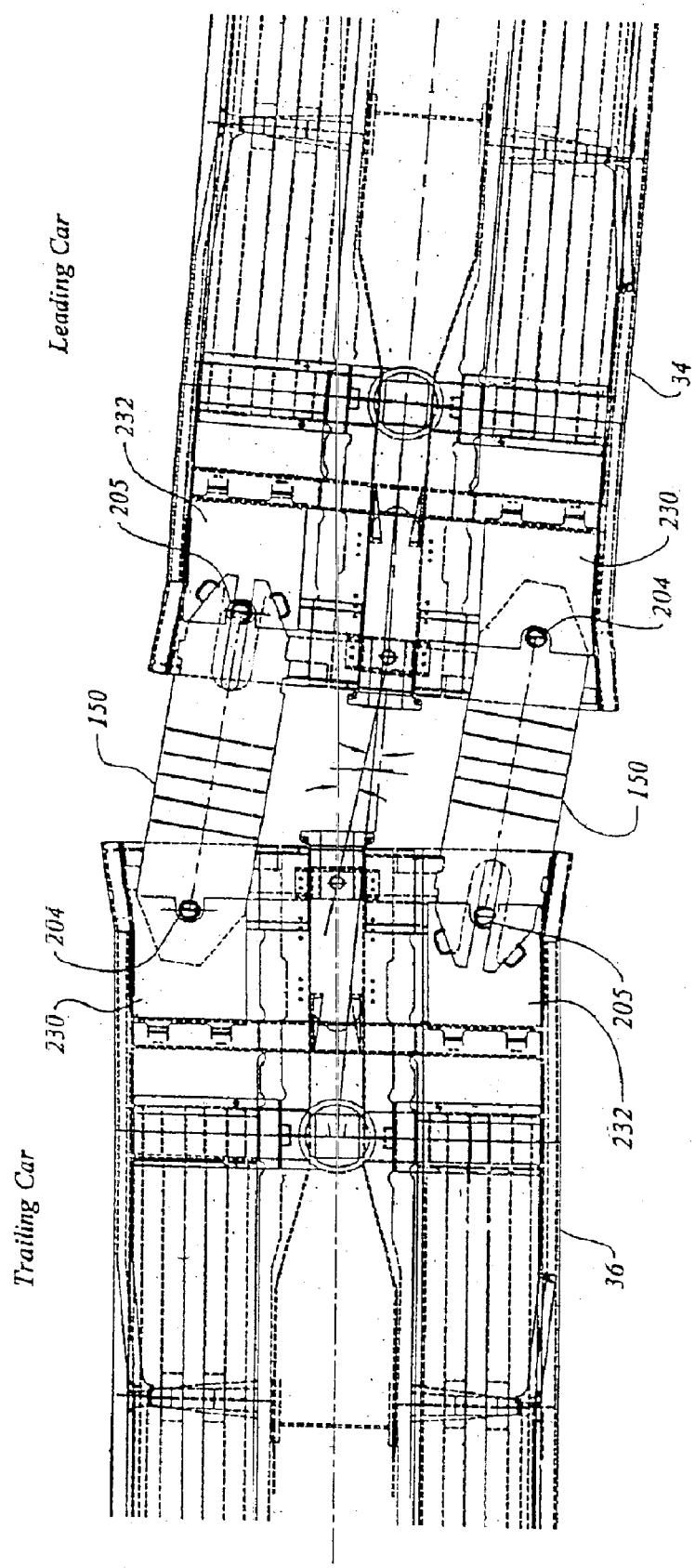
FIG. 5c is a top view of the bridge plate of FIG. 5a showing in service deflection.

When seen from above, as in FIG. 3h, the outboard end portions 146 and 148 of side sills 84 and 86, respectively, are splayed laterally outward to give a flared end to the pathway, trackway, or roadway, defined between the curbs of their respective top chord members 90. The flare is achieved with a mitre, or chamfer, but could also be achieved with a smooth curve, and serves to provide a lead-in for truck wheels to the straight curb portions of top chord members 90 and to allow motion of the bridge plates during operation, as indicated in FIG. 5c.

A gap spanning structural member, or beam, namely bridge plate 150, is indicated in FIGS. 4a, 4b, 4c, and 4d. Bridge plate 150 is preferably of steel construction, but could be of aluminum, or suitable reinforced engineered plastics, to reduce the weight to be manipulated by railyard crews. Bridge plate 150 has the construction of a rigid flanged beam, having a top flange, or sheet 152, upon whose upper surface 154 vehicles can be conducted. Sheet 152 is backed by a pair of spaced apart, longitudinally extending channel members 155 and 156, welded with toes against sheet 152. A pair of formed angles 158 and 160 are welded laterally outboard of channel members 155 and 156, and a plate 162 is welded to span the gap between the backs of channel members 155 and 156. In this way plate 162, the backs of channel members 155 and 156, and the horizontal legs 164 and 166 of formed angles 158 and 160 act as a bottom flange in opposition to the top flange, sheet 152, with the other legs and toes acting as vertical shear transfer webs. A traction enhancement means is provided to give bridge plate 150 a non-smooth, or roughened track, in the nature of laterally extending, parallel, spaced tread bars 168 welded to the mid-span portion of sheet 152.

At one end, defined as the proximal, or inboard end, 170, bridge plate 150 has a pivot fitting, in the nature of a pair of aligned holes 172, 173 formed in sheet 152 and plate 162 to define a hinge pin passage. The axis 174 of the passage formed through hole 172 is normal (i.e., perpendicular) to upper surface 174 of sheet 152, and, in use, is ideally vertical, or predominantly vertical given tolerance and allowance for yaw, pitch, and roll between the rail road cars. Proximal end 170 is chamfered as shown at 176, 178 and is boxed in with web members 180, 182. Although a mitre is preferred for simplicity of manufacture, either end of bridge plate 150 could have a rounded shape, rather than a mitre.

At the other end, defined to be the distal, or outboard end, 184, bridge plate 150 is bifurcated, having a linear expansion member in the nature of a longitudinally extending guideway, or slot, 186, defined between a pair of tines, or toes 188, 190, each having an external chamfer as shown at 192, 194. The distal ends of channel members 154, 156 are also boxed in at distal end 184 as shown at 196. A web member, in the nature of a gusset 198 is welded between the facing walls of channels 155 and 156, adjacent to the groin of slot 186, to encourage toes 188 and 190 to maintain their planar orientation relative to each other.

As shown in FIG. 5a, bridge plate 150 can be mounted in an employed, drive-over, or length-wise extended position, in which distal end 184 is located longitudinally outboard of end sill 122, and in which the longitudinal axis of bridge plate 150 is parallel to the longitudinal centerline axis of car unit 34 (on straight track, but otherwise depending on pitch and yaw between cars) to permit vehicles to be conducted between cars. Bridge plate 150 can also be mounted in a stowed, lateral, transverse or cross-wise position, as shown in FIG. 5b, in which the centerline of bridge plate 150 is perpendicular to the longitudinal centerline of car unit 34.

Shelf portion 134 has a first bore formed therein to one side of longitudinal centerline of unit 34. A pivot fitting, or mounting fitting, in the nature of a collar 200 is mounted flush with, or slightly shy of the upper surface of shelf portion 134, at a first location, indicated as bore 202, for alignment with through hole 172. As discussed below in the context of FIGS. 8a–8c the toe of bridge plate 150 can be tipped up slightly. To do this, the rear, or longitudinally inboard edge of shelf portion 134 acts as a fulcrum. A retaining member, in the nature of a hinge pin 204, is fabricated from a section of pipe 206 of a size permitting a loose fit within collar 200 to allow for roll, pitch and yaw between cars. Pipe 206 has a flange 208 mounted at one end, the proximal or upper end. Flange 208 bears on sheet 152 to prevent pipe 206 from falling though collar 200. Pin 204 also has a lifting fitting in the nature of a internal cross bar 209 mounted at the flanged end. Bar 209 is grasped to withdraw pin 204 (or 205, below). The distal or lower end of pipe 206 is slotted to accept a transverse pin 210, itself held in place by a locking member in the nature of a cotter pin, that prevents hinge pin 204 from unintentionally lifting out or collar 200. Shelf portion 134 also has an abutment, or stop, not shown, welded to the upper surface of plate 130 to prevent bridge plate 150 from being pivoted past the stowed position, and so preventing the side of bridge plate 150 from hitting cam crank 241 (described below) inadvertently if transition plates 232 is in the raised position (also described below).

When hinge pin 204 is in place, bridge plate 150 is restricted, or constrained, within the limits of a loose fit, to a single degree of freedom relative to rail car unit 34, namely pivotal motion about a vertical axis. The sloppy, or loose, fit of hinge pin 204 within collar 200 gives a limited amount of play to permit tipping the bridge plate upward during coupling, and to permit sufficient roll, pitch and yaw for normal railroad operation. In the preferred embodiment, a nylon (t.m.) pad 211 is mounted to the underside of bridge plate 150 to provide a bearing surface for riding against shelf portion 134. In alternative embodiments other types of relatively slippery, high density, or UHMW, polymer materials could be used.

Shelf portion 134 of shear plate 130 has a second bore formed therein offset to the other side of longitudinal underside of car unit 34. As shown in FIG. 7g, another collar 200 is mounted to the underside of, and flush with (or, shy of) plate 128 of shelf portion 134 at a second location, indicated as bore 214, at the same longitudinal station as bore 202 for alignment with slot 186 when bridge plate 150 is in the lateral, or storage, position resting fully on shelf portion 134. Another hinge pin 205, of the same construction as pin 204 described above, is provided to secure bridge plate 150 in the stowed position, the distal end of pin 205 locating in bore 202 and the proximal end locating in slot 186 defined between toes 188, 190. When hinge pin 205 is removed, bridge plate 150 is able to pivot about the hinge formed by the co-operation of hinge pin 204, collar 200 and through hole 172.

When a bridge plate such as bridge plate 150 is in the extended (i.e., lengthwise, or longitudinal) position, and its distal end (or tip) engages the adjacent car, pin 205 is again used, this time to provide a positive, securing, retaining, indexing, or alignment member to the engaging fitting, namely slot 186. Slot 186 is then constrained, within the confines of a loose fit, to permit motion along a first linear degree of freedom, namely to slide as the gap between cars shortens and lengthens as adjacent rail car units yaw, or translate transversely, relative to each other, and a rotational degree of freedom relative to the locating pin, i.e., pin 205, of the adjacent car. As above, the loose fit of pin 205 in slot 186 allows for normal pitch and roll motion of the cars. As shown in FIG. 5c, the combination of a rotational degree of freedom at pin 204 of one rail road car, and both rotational and linear displacement at pin 205 of the other rail road car, accommodates both curving and transverse displacement of the coupler ends relative to each other. That is, the interaction of slot 186 with pin 205 provides both a pivot fitting for accommodating yawing motion of the adjacent rail road car, but also provides a linear expansion member for accommodating variation in distance between the respective vertical axes of pin 204 (and, collar 200) of one rail road car, e.g., car 22, and pin 205 (and its collar 200) of the adjacently coupled rail road car, e.g., car 21.

Figures 4A, 4B:
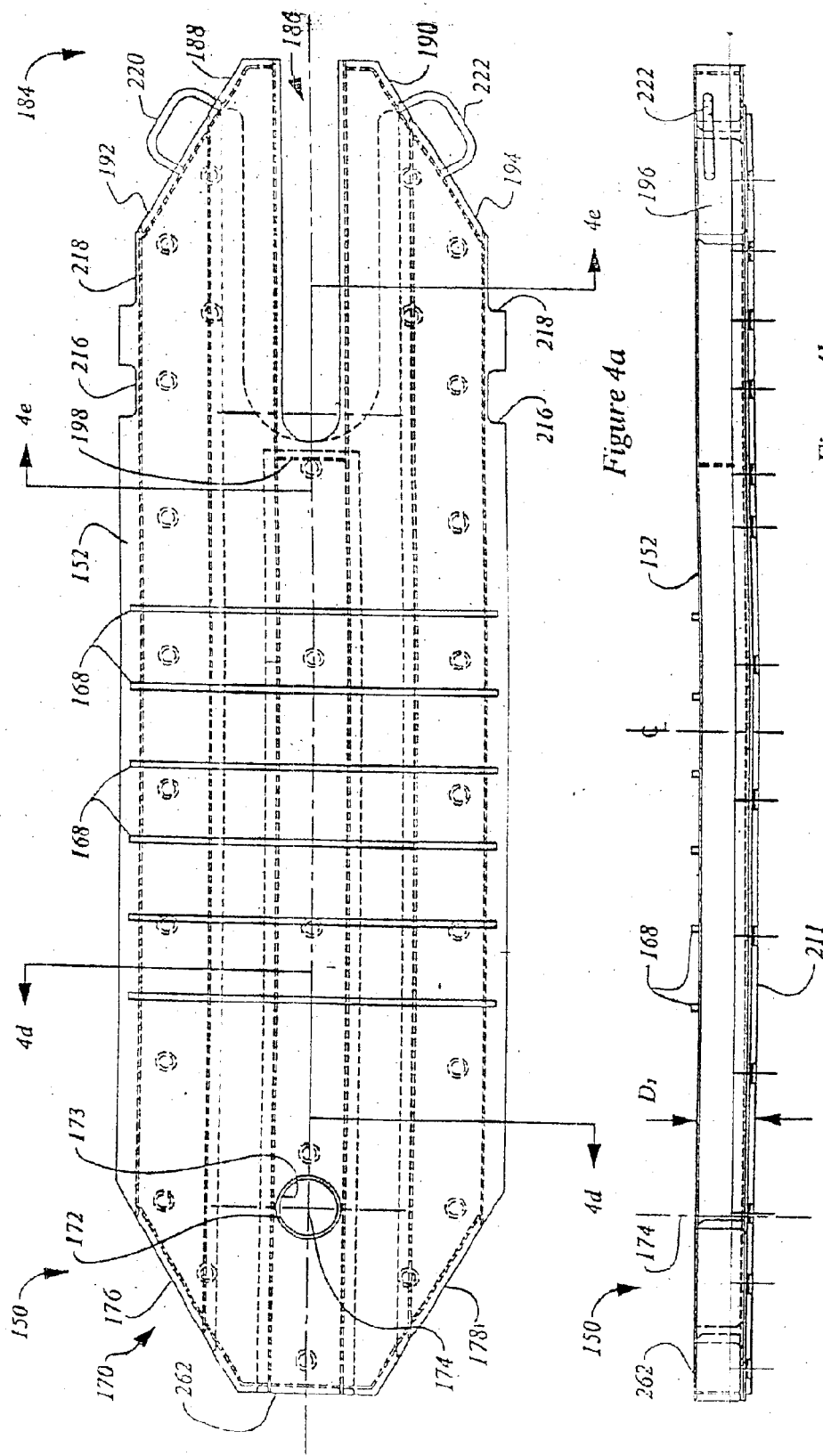

When viewed in FIG. 4a it can be seen that bridge plate 150 has cut-outs 216, 218 formed in its distal end to accommodate cam crank 241 (described below) when bridge plate 150 is in the stowed position, and a pair of hand hold rungs 220, 222 mounted to the chamfer of toes 188, 190 to facilitate pulling of bridge plate 150 from the stowed position, and to facilitate tipping the distal end, or toe, of bridge plate 150 upward, preparatory to coupling two rail car unit coupler ends together.

Figure 6A:
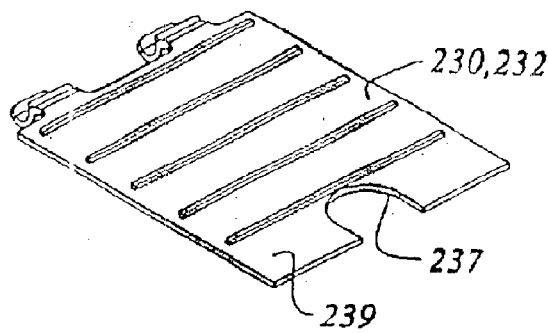
Figure 6B:
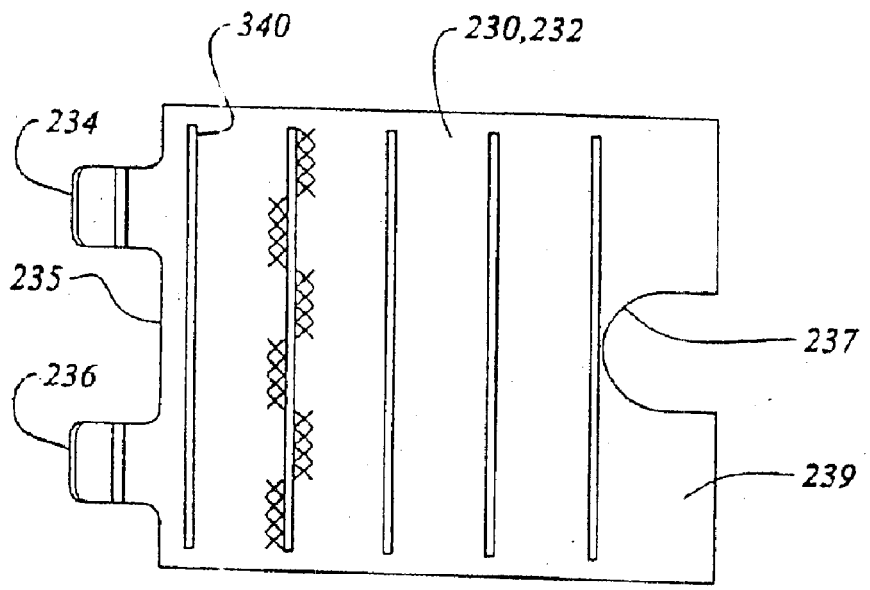
Figure 6C:
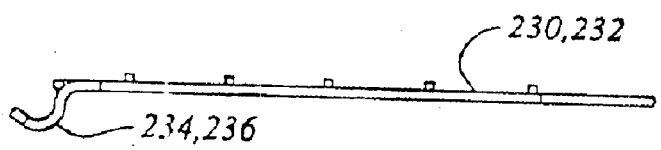

Left and right hand transition plates are shown in FIGS. 6a, 6b, and 6c as 230, 232. Each has pivot fittings in the nature of arcuate hinge tangs 234, 236 extending from proximal edge 235. Hinge tangs 234, 236 locate in corresponding apertures, namely rectangular slots 238, 240 (FIG. 7g) formed in back 140 of formed channel 136. Hinge tangs 234, 236 and slots 238, 240 co-operate to permit upward lifting of their distal tips by pivotal motion of each of transition plates 230, 232 about a horizontal pivot axis lying perpendicular to the longitudinal centerline of rail car unit 34. As above, there is tolerance in the fit of tangs 234, 236 and slots 238, 240 to allow for normal railcar motion. Transition plates 230 and 232 cover the gap that could otherwise exist between the inboard, or proximal end of bridge plate 150 (on one side, i.e., 230) or the toes of the bridge plate of the adjoining rail car (on the other side, i.e., 232) and the end of deck 47 of rail car unit 34. Since transition plates 230 and 232 are relatively thin (⅝ inch) they do not present a large bump when highway trailer wheels encounter them. Transition plates 230, 232 each have a U-shaped central relief 237 formed in distal portion 239 to avoid fouling pin 204 (or 205).

In the preferred embodiment, the upper surface of bridge plate 150 is roughly flush with the level of the adjacent end of deck 47, as taken at the height of the upper surface of the top flange fabricated cross-beam 136, such that a generally level roadway is formed. It is possible to conduct highway trailers from bridge plates 150 to deck 47 without the use of transition plates 230, 232, but is more advantageous to use transition plates. It is also not necessary that the depth of shelf portion 134 relative to the end of the deck, (i.e., the height of the step) indicated as $D_1$, be the same as the depth of bridge plate 150, indicated as $D_2$. It is advantageous that the height differential between the top of bridge plate 150 and the end of deck 47 be small, such as less than 1–½ inches, and better still, less than ½ inch to reduce the potential bump. The severity of the bump is also reduced by the use of transition plates 230, 232, that permit a mismatch in height to be taken up over a modest longitudinal distance, rather than suddenly.

It is also possible to use a bridge plate support member other than shelf portion 134. For example, a cross-beam or cantilevered beam could be used, whether mounted to end sill 122, center sill 60, side sills 84, 86 or some combination thereof. Alternatively a pedestal could be employed having an upwardly protruding pin in place of pin 204, and an alternative form of second retainer in place of pin 205, such as one or more retractable abutments, whether spring loaded or otherwise in the manner of spring loaded detents, or a releasable hook or latch, could be used to similar effect. The use of a bridge plate kit including bridge plate 150 and pins 204 and 205 is advantageous since pins 204 and 205 are interchangeable, are used to provide motion-tolerant retention of the proximal end (by pin 204) and distal end (by pin 205) of bridge plate 150 in either lengthwise or cross-wise positions, are relatively robust, and are of relatively simple fabrication.

Left and right hand cam cranks are indicated in FIGS. 3h and 7a to 7g, as 241, 242. Each cam crank is formed from a bent steel bar. Each cam crank has an inboard hinge portion 244 and an outboard hinge portion 246 that lie on a common hinge axis, 248. As shown in FIGS. 7f, 7g, inboard hinge portion 244 seats in an aperture or socket 245 mounted to the underside of, and at the laterally outboard edge of, top flange 72, longitudinally outboard of main bolster 120. Outboard hinge portion 246 seats in an aperture 247 formed through side sill 84 (or 86, as the case may be). Socket 245 and aperture 247 act as hinge fittings within which the shaft portions of cam cranks 241 and 242 are constrained to turn. The laterally outboard, or distal, end of hinge portion 246 has a torque input fitting, in the nature of an obliquely angled transverse bore indicated as slot 249. This angle α is greater than the outward cant of the side sill web and, in the preferred embodiment illustrated is about 25 degrees. Slot 249 admits entry of a lever member in the nature of a turning handle, or pry bar, by which means railroad personnel can impose a turning torque on cam crank 241, 242. As shown, oblique slots 249 are formed in both ends of cam crank 241, 242 permitting the same part to be used as either 241 or 242 rather than requiring fabrication of different left hand and right hand parts. The obliqueness of slot 249 permits a straight bar to be inserted with less tendency, when rotated, to foul side sill 84 or 86 as the case may be. Although slot 249 is preferred, other types of torque input fitting, such as a bent arm (to act as a lever), a lateral pin of shaft, a keyway, a spline or splines, a hexagonal or square head to be engaged by a wrench or socket, an alien head and so on could be used. Slot 249 conveniently does not require the use of a special socket or key of a particular size.

A first radially extending member, in the nature of an M-shaped cam throw portion 250 extends between inboard and outboard hinge portions 244 and 246, and will be forced through an arcuate path when a sufficiently large torque is applied though the crank. In so moving, the flattened peaks of the M-shape, indicated as 254, 255, act as cams that work to raise distal portion 239 of bridge plate transition plate 230, (or 232), forcing plate 230 (or 232) to pivot, the proximal end of plate 230 being held down by hinge tangs 234, 236 so that the tip, i.e., distal portion 239 of plate 230 (FIGS. 6a, 6b, 6c) is lifted clear of bridge plate 150. Flattened peaks 254 and 255 (FIGS. 7a, 7b, 7c) are provided with bushings, or rollers 257, that bear against the underside of bridge plate transition plate 230 (or 232).

If bridge plate 150 is in an employed, i.e., extended, position when transition plate 230 is lifted, it may tend to want to droop downward since it is cantilevered out over end sill 122 without sufficient reaction force, or weight, at the proximal end to keep the distal end up. A downward droop may tend not to be advantageous when pushing cars together to be coupled, since the distal tip would then have a tendency to jam into the end sill of the adjacent car. It is also not desirable to require railroad employees to have to hold the bridge plate tips up as railcars come together. To that end the middle portion of the M-shape, indicated as 258 has a retainer, in the nature of a protruding catch, pawl, tooth, stop or abutment 260, fabricated in the form of a bent, t-shaped tang 261 with arms welded to either side of portion 258 and the tongue of tang 261 extending above and beyond portion 258. When cam crank 241 is rotated to lift plate 230, abutment 260 is placed in a position to intercept the most inboard edge 262 of sheet 152. When thus engaged, abutment 260 discourages bridge plate 150 from drooping as adjacent cars are brought together.

Further, cam crank 242 can be moved to a fully engaged position to lift transition plate 232 whether or not a bridge plate is present. When the tip, or distal, portion 239 of plate 232 is thus lifted, the distal tip of a bridge plate 150 of an adjoining car can then be introduced, as shown in FIGS. 8a and 8b. As the tip of the other bridge plate moves into position, it engages the M-shape of cam crank 242 and pushes it backward (i.e., counterclockwise from the viewpoint of a person standing beside car unit 34 facing side sill 86 on the handle side of cam crank 242) to a disengaged position. As this happens, transition plate 232 falls down to engage the upper surface of the incoming bridge plate in an overlapping position. Once the tip of the other bridge plate is on shelf portion 134 (FIG. 8d) it can be nudged (if required) into position to permit pin 205 to be inserted.

The sequence of operation for uncoupling two rail road cars such as cars 21 and 22 to permit conversion from "drive-over" ends to a "ramp end" is as follows: Remove the cross-pin from the lower slot of pin 205. Lift pin 205 and place on deck 100. Support the distal tip of bridge plate 150 (can be manually lifted, or alternatively, propped in place). Engage a pry bar or similar bar as a lever in the outboard oblique slot in cam crank 241, and apply a force to the bar to generate a torque to twist cam crank 241 counter-clockwise (as viewed facing the side sill by a person standing beside the car applying force to the lever). This causes the distal edge of transition plate 230 to lift, thereby disengaging plate 230 from bridge plate 150. Engage abutment 260 to edge 262 of bridge plate 150. (The distal tip of bridge plate 150 can be released once abutment 260 is engaged). Engage a pry bar as a lever in the outboard oblique slot in cam crank 242 and twist in a clockwise direction to lift transition plate 232 to a position for receiving another plate. (This step can either precede or follow the step of lifting transition plate 230). Operate the uncoupling rod to unlock the coupler and close the angle cocks (standard steps for uncoupling railcars generally). Pull the rail road cars apart. Rotate (i.e., pivot) bridge plate 150 clockwise (as viewed from above) on pin 204 until toes 88 and 90 rest on shelf portion 134 beneath the overhang of plate 232. Adjust as needed to permit pin 205 to enter collar 200, and install pin 205 to secure the distal end of the bridge plate in place in the stored position. Lower plate 232 to engage, i.e., sit on, bridge plate 150.

To reverse the process: Unlock, and remove pin 205. Use a pry bar as a lever in the outboard oblique bores (i.e., slot 249) of cam cranks 241, 242 to raise intermediate transition bridge plates 230, 232, disengaging them from bridge plate 150. Haul bridge plate 150 out of its storage position by rotating (i.e., pivoting) it counter-clockwise about pin 204 to the extended position, with edge 262 restrained under abutment 260. This is the position shown in FIG. 8a. Advance the rail cars towards each other to cause the respective bridge plates 150 to be received under respective intermediate transition plates 232, each bridge plate advancing to encounter cam crank 242 of the opposing railcar, knocking it down as the couplers connect. (See FIGS. 8b, and 8c). Replace pins 205 of each respective car, nudging or adjusting the bridge plates as required, partially raising bridge plate 232 if necessary to facilitate this nudging, and locking pins 205 in place when seated satisfactorily, thus securing bridge plate 150. Lower plate 230 onto bridge plate 150. Re-establish the coupling between the two cars, including brake lines. The train is again ready to be moved along the rail line.

Alternatively, following the sequence of FIGS. 8a, 8e, 8f and 8d, when moving the rail road cars together, once the toe of bridge plate 150 (of, for example, car unit 34 of car 22) overhangs shelf portion 134 of the adjacent car (e.g., car unit 36 of car 24), locomotive 38 can be stopped. Bridge plate 150 can be lowered to lie on the receiving portion of the adjacent car, namely shelf 134, by twisting cam crank 242 to release the heel edge, edge 262, of bridge plate 150. The locomotive can continue to urge the cars together, with bridge plate 150 sliding across shelf 134 to meet cam crank 241. The procedure may then continue as before, with re-insertion of pin 205, and so on.

In either sequence, the process includes the steps of positioning the respective bridge plates of the rail road cars in a length-wise orientation and advancing the rail road cars toward each other to cause their respective couplers to mate. The step of advancing includes the step of engaging an extended portion, the distal tip, of each of the bridge plates with a receiving member, shelf portion 134, of the other rail car. The step of positioning each of the bridge plates includes securing the distal tip in a raised attitude relative to the proximal portion, as described above. The step of engaging includes a step of securing each the bridge plate to the other of the rail road cars by re-inserting hinge pin 205 to link slot 186 of each bridge plate with the socket formed by the respective collars, 200.

The step of advancing the cars together is preceded by the step of moving (i.e., raising) transition plates 232 to the raised position to facilitate engagement of bridge plate 150 with the receiving member, namely shelf portion 134. The step of engaging is followed by the step of placing, (i.e., lowering) transition plate 232 to an overlapping position between the received distal tip of bridge plate 150 and vehicle carrying deck 47. The step of raising transition plate 232 includes the step of employing a prop, namely cam crank 241 to maintain transition plate 232 in the raised position. The step of engaging includes advancing the bridge plate to disengage the prop, thus causing transition plate 232 to move to the overlapping position.

On level track, the swinging of bridge plate 150 between length-wise and cross-wise positions occurs in the plane of shelf portion 134, that plane being a horizontal plane, such that rail yard personnel do not need to raise (or lower) the bridge plate to (or from) a vertical, or nearly vertical, position as was formerly common. Further still, since the arrangement of bridge plate 150 can accommodate train motion, whether due to pitch, yaw, roll or uneven spring compression between, for example, car units 34 and 36, bridge plate 150 may remain in its extended, bridging position spanning the gap between units 34 and 36 when rail road cars 22 and 24 are in motion, and does not need to be moved each time the train is loaded or unloaded. Bridge plate 150 may tend not to need to be moved to or from its stowed position except when rail road cars 22 and 23 (or such others as may be joined together) are split apart from their neighbours, or joined together again. This may occur only relatively infrequently to permit the train consist to be changed. This may tend to reduce the number of times rail yard personnel are required to handle the bridge plates, and may tend to reduce the length of time required for loading and unloading.

The process for changing bridge plate 150 from the length-wise position to the cross-wise position is relatively simple: the rail car is established in an uncoupled position by uncoupling the rail road cars and moving them apart, thus disengaging the distal tip of bridge plate 150 from the adjacent car, and establishing bridge plate 150 in the extended position. Pin 205 is removed, transition plate 230 is disengaged from bridge plate 150 by raising its distal portions clear of bridge plate 150. Plate 232 is also raised. Then bridge plate 150 is moved from the length-wise position to the cross-wise position. As noted, the step of moving includes swinging bridge plate 150 in the horizontal plane of portion 134 about the pivot mounting provided by the interaction of pin 204 in collar 200. This is followed by securing bridge plate 150 in place by reinserting pin 205 as a retainer, and by re-engaging transition plates 230, 232, as by lowering them to the overlapping position. The step of disengaging the transition plate from the bridge plate includes the step of operating cam cranks 241, 242 to lift the distal portions of transition plates 230, 232. The step of operating the cam cranks includes the step of turning them to bear against the transition plates.

The process of converting and re-coupling cars can be followed by a series of steps for unloading, and then loading (or re-loading) that include placing ramps at the rail road car ends, as described above and shown in FIGS. 1a–1e. In the loading and unloading processes the hostler truck and the highway trailers will cross bridge plate 150 in its stored, or laterally transverse, position.

It may be noted that while telescoping bridge plates could possibly be employed, it is preferred to use a monolithic bridge plate, such as bridge plate 150. That is, bridge plate 150 is a rigid beam. It does not have two beam portions that slide together. The pivot fitting at the proximal end anchored by pin 204, and the combined pivot and slot fitting for engaging pin 205 have a relatively large tolerance, and do not bear either a shear load or a bending moment load when vehicles traverse bridge plate 150. Bridge plate 150 acts as a lintel, or beam, of sufficient length to span the gap between the ends of the two adjacent rail road cars when motionless on straight track, the lintel being supported at either end by two shelves. As such, it has the advantage of comparative simplicity.

Figure 9A:
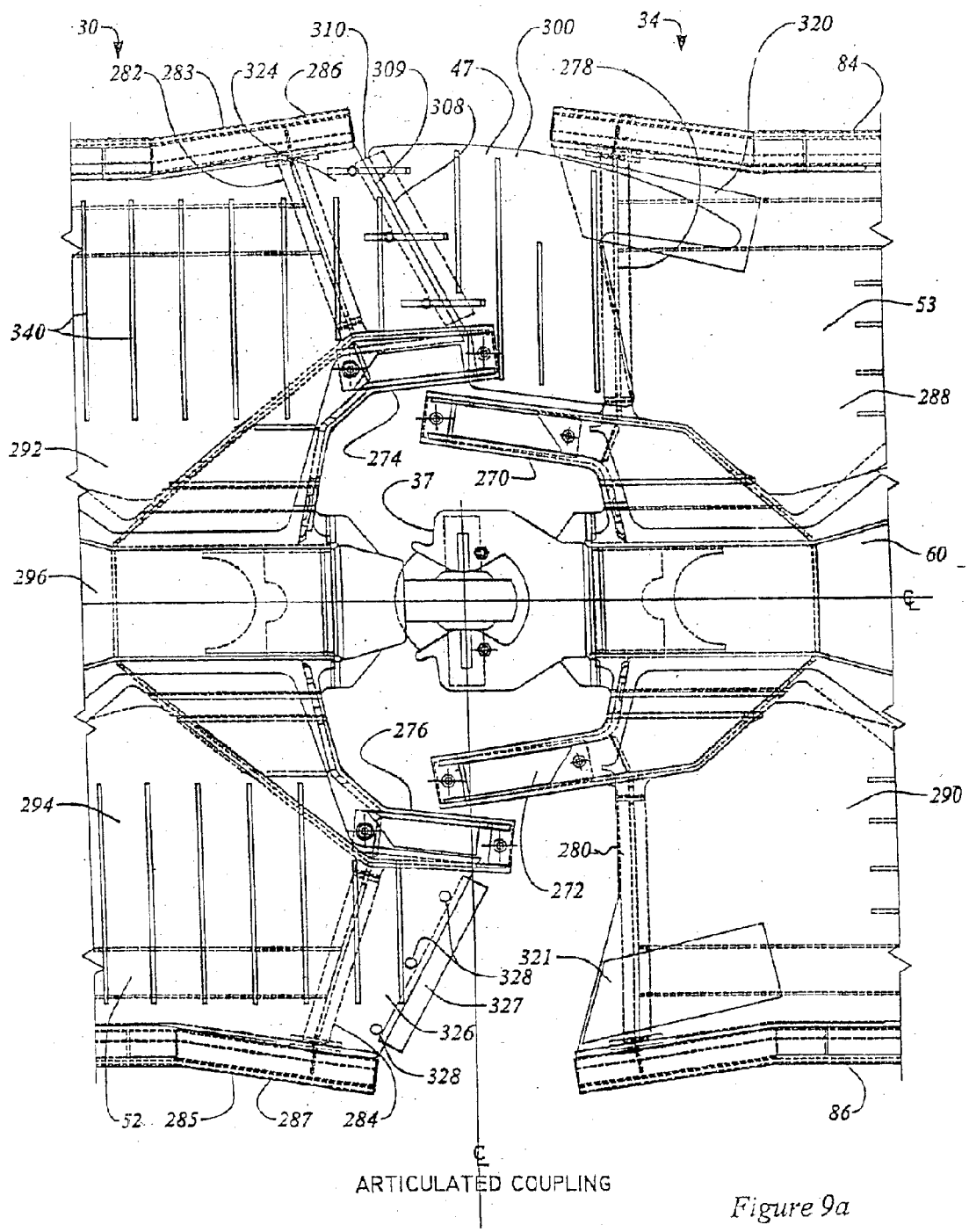
FIG. 9a shows a top view of an articulated connector end of the rail car unit of FIG. 3a and another adjoining rail car unit.

Considering now the far end of car unit 34, namely the articulated connection end 70, shown in FIG. 9a, the main vertical shear load is carried though main center sill 60 to articulated connector 37 and into shared truck 39. A male pair of left and right hand dog-legged side bearing arms 270 and 272 are rooted to main center sill 60 longitudinally outboard of end body bolster 268. The male pair of side bearing arms of the 'B' unit, namely side bearing arms 270 and 272 of car unit 26, nest within the corresponding left and right hand female side bearing arms 274, 276 of the adjoining car unit, intermediate "C" car unit 30. In each case the side bearing arms, 270, 272, 274, and 276 are mounted above side bearing reaction seats, or pads, mounted to the truck bolster of shared truck 37. Left and right hand end sills portions 278, 280 extend between side bearing arms 270, 272 and side sills 84, 86. In the case of car unit 30, left and right hand end sill portions 282, 284 extend between side bearing arms 274, 276 and side sills 283, 285. In each case, side sills 84, 86 and side sills 282, 284 have chamfered ends as indicated at 286, 287, to give a flared opening analogous to that described above at the coupler end of car unit 34.

The decking of car unit 34 is indicated generally as 47, and includes left and right hand deck plates 288, 290 mounted generally flush with, and to either side of, the top flange of center sill 60. Similarly, the decking of car unit 30 is indicated generally as 48, and includes left and right hand deck plates 292, 294 mounted to either side of, and generally flush with, the top flange of center sill 296.

Figure 9B:
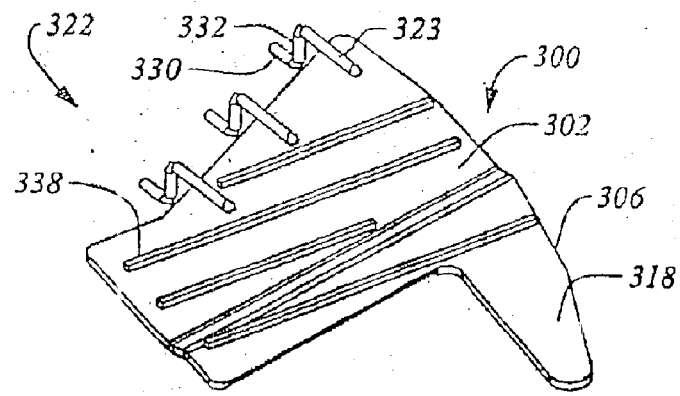
Figure 9C:
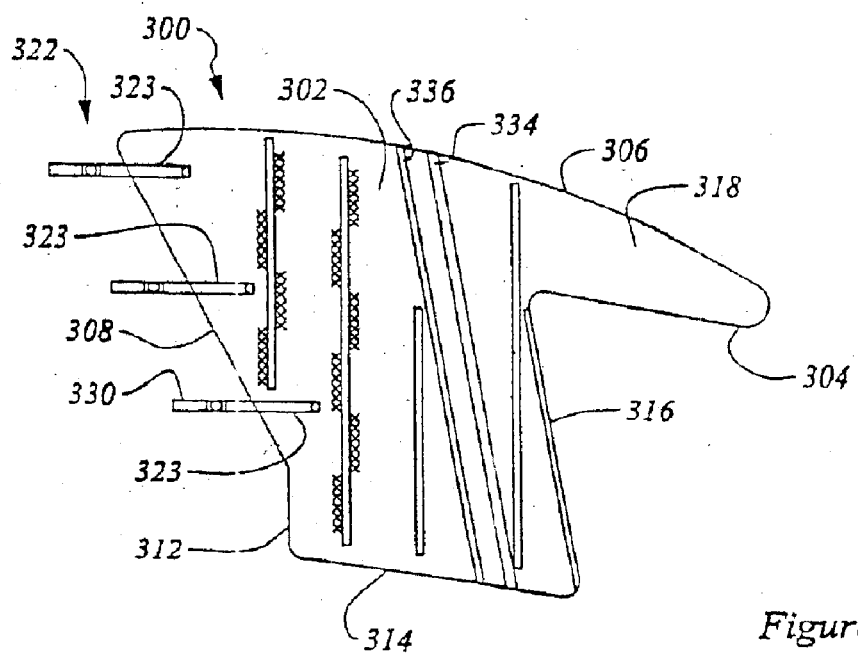
FIG. 9c shows a top view of the bridge plate of FIG. 9b.
Figure 9D:
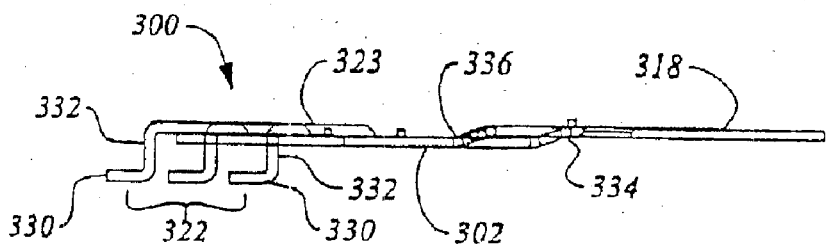
FIG. 9d shows a side view of the rail road car of FIG. 9b.

Articulated connection end bridge plates 300 include left and right hand plate assemblies. Although FIG. 9a and the detail drawings of FIGS. 9b, 9c and 9d show a left hand plate assembly 300, the corresponding right hand plate is of the same design and construction, and is a mirror image of the assembly shown. Hence a description of the left hand plate serves also to describe the right hand plate. Assembly 300 includes a plate member 302 with a peripheral profile 304 as seen in FIG. 9c. The outer portion 306 of profile 304 forms a circular arc having a center of curvature at the pivot center of articulated connector 37 (as seen from above in FIG. 9a). The arc of outer portion 306 falls within the profile of flared ends 284, 286. Working in a counter-clockwise direction in FIGS. 9a and 9c, adjacent to arc 306, profile 304 has a straight portion 308 cut on a mitre to correspond to the mitred edge 309 of deck plate 292 (or 294, if opposite handed). The plates are mitred to conform to the taper of the end of deck 48. At the laterally inboard end of mitred edge, portion 308, is an inward tab, 312, and an inboard edge 314 following, generally, the profile of the male side bearing arm 270 (or 272, as may be). An outwardly extending edge 316 runs obliquely outward from inboard edge 314 to terminate at a generally arcuate horn, or protruding wing 318 whose outer edge is defined by circular arc. The underside of wing 318 bears on a stainless steel wear pad 320 (or 321, opposite hand) welded to the upper surface of deck plate 292 (or 294) in the region of the flare of side sill 84 (or 86) over end sill portions 278, 280. A stainless steel wear plate may tend to be less prone to rust than mild steel, and, like assembly 300, can be replaced as a consumable if needed.

An array of deck engagement fittings is indicated generally as 322 and includes plate retainers in the nature of three parallel bars bent into 'Z' shaped hooks. The first, upper leg 323 of the 'Z' is longer than the lower leg, and is welded in position lying along the top of plate 302 and, when installed, extends parallel to the rail car longitudinal centerline of unit 30, as shown in FIG. 9a. Deck plates 292 and 294 of car unit 30 have deck extension portions 324, 326 that extend past respective end sill portions 282 and 284 and that are welded on inboard and outboard edges to female side bearing arms 274, 276 and corresponding flared side sill end portions, namely chamfers 286, 287.

Extension portions 324, 326 have members for supporting the adjacent edge portion 308, namely a backing bar, or shelf 327 welded to extend past the lip of the mitred edge of deck 48. Extension portions 324, 326 also have mating fittings for engaging the hooked ends of fittings 322, namely a set of corresponding holes 328 and are cut on a mitred angle to match the mitre of edge 308. The short end legs 330 of fittings 322 can be inserted into holes 328, and then assembly 300 can be pivoted and the vertical riser portions 332 slid through the holes, such that assembly 300 is placed in its installed position. As such, assembly 300 can be raised relatively easily by hand to permit replacement or to permit separation of rail car units 26 and 30, as may be required to permit replacement of the shared truck during a maintenance overhaul. As additional features, assembly is stepped downward at oblique fold lines, indicated at 334, 336, and has traction bars 338 to encourage better grip as vehicles are moved thereover. Traction bars 340 are also provided on deck 56.

As illustrated, the "B-end" unit, rail car unit 34, has two collapsible hitches 112, 114 as indicated above. The "A-end" unit, rail car unit 26 has a single collapsible hitch, mounted over the main bolster, and the intermediate "C" unit, rail car unit 30, has a collapsible hitch mounted roughly 6 feet longitudinally inboard of the nearest point of articulation. The choice of hitch number, and location may vary depending on the anticipated population of trailer sizes to be carried. As such, any of the "A", "B", "C" or other units may have a single collapsible hitch, or two collapsible hitches, at the option of the rail car buyer. The proximity of hitch 114 to the articulated connector end of rail car unit 30 is such that hostler truck 40 is supported by plate assemblies 300 when picking up a trailer from hitch 114. It is advantageous to maintain a flush deck, as at the portion of assembly 300 immediately adjacent to deck 48, to give the hostler truck more vertical clearance under the nose of the highway trailer than if the assembly 300 were raised to overlap deck 48.

As shown in FIGS. 3f, 3g and 3h, deck access fittings, in the nature of steps 350, 352 and hand grabs 354, 356 are located inboard of the king-pin mounting centerline of hitch 112 (or 114, as the case may be) a distance δ generally corresponding to the distance between the king pin and the crank for the landing gear of the highway trailer. These deck access fittings may tend to permit rail yard personnel to mount the rail car units (whichever they may be) more closely adjacent to the position of the landing gear cranks of the highway trailers, reducing the distance to walk along the car, and reducing the need to edge past the nose of the highway trailer to reach the landing gear crank.

The preferred distance δ from the center of the hitch kingpin fitting to the center of the ladder rungs (or steps 350, 352, as may be the case) is about 88 inches, the rung width is about 18 inches and the opening between the hand grabs 354, 356 is about 24 inches, the height of the hand grabs being about 8 inches above the top of the top chord, and the top of the top chord being about 8 inches above the deck on which the highway trailer wheels roll. While the optimal distance will vary depending on the size and strength of the person operating the landing gear crank of the highway trailers, a range of distances would be suitable from 5 to 10 feet inboard (i.e., rearward relative to a highway trailer mounted to the hitch plate) of the hitch king-pin centerline, and preferably 7 to 8 feet inboard.

Running-boards 358, 360 are mounted to side sill web 92 longitudinally to either side of steps 350, 352 and extend along web 92 adjacent to hand grabs 354, 356. In the preferred embodiment the length of each running board is 41 inches, and the width is 6 inches. A running board size in the range of 30 to 60 inches, or preferably in the range of 3 to 4 feet, allows for different sizes and strengths of operators, and may permit operation of the crank either predominantly with the right hand or predominantly with the left hand as may suit the user. Running boards 358, 360 are provided with deformed metal perforated non-skid grating sheets 362. Running boards 358, 362 are mounted slightly below (roughly 2") the adjacent deck level such that personnel operating highway trailer landing gear cranks may stand somewhat more upright, and may tend to have a better posture while operating the loading gear crank than if standing at the same level as the rail car deck.

Although ladder rungs are shown mounted to side sills 84, 86, other types of climbing foothold can be used. For example, in the alternative embodiment of FIG. 13, a rail road car side sill assembly 370 is provided with square sided foot holds 372 formed in the web 374 of the side sill.

Returning to hitches 112 and 114, and FIGS. 14a (hitch raised), 14b, and 14c (hitch lowered), the width of deck 47 between side sills 84 and 86 is indicated as $W_D$. In the preferred embodiment this width is 104 inches. The $W_D$ deck width is chosen to accommodate the maximum highway trailer bogie tire width width, nominally 102 inches. Hitch 112 (or 114, as the case may be) is a retractable, tractor operated hitch that can be raised an lowered by hostler truck 40. It has a front pivot mount 375 and a rear pivot mount 376, each falling within a hitch width designated as $W_H$. Inasmuch as not all highway trailers have bogies of the same width, if the outside tire sidewall on one side is bearing against the chamfered inside face of either side sill 84 or 86, the inside tire sidewall will be closer to hitch 112 (or 114) than the corresponding inside face of the opposite inside tire. Hitch width $W_H$ is chosen such that it is less than or equal to the dimension obtained by adding the minimum overall outside highway trailer bogie tire width $WTO_{(MIN)}$, nominally 96 inches, and the minimum inside highway trailer bogie tire width $WTI_{(MIN)}$, nominally 47 inches; and subtracting deck width $W_D$, 104 inches and an amount of at least 1½ inches to account for the bulge of the side walls of the tires. This value is 37½ inches. It is preferred that $W_H$ be 37¼" or less.

The foregoing description has been generally directed to elements related to deck 47 and operational features associated with deck 47. FIGS. 12a and 12b show the draft gear at the coupler end of rail car unit 34, being representative of the coupler end draft gear of rail road cars 21, 22, 23, 24 and 25 more generally. Coupler pocket 62 houses a coupler indicated as 44. It is mounted to a coupler yoke 378, joined together by a pin 380. Yoke 378 houses a coupler follower 382, a draft gear 384 held in place by a shim (or shims, as required) 386, a wedge 388 and a filler block 390. Fore and aft draft gear stops 392, 394 are welded inside coupler pocket 62 to retain draft gear 384, and to transfer the longitudinal buff and draft loads through draft gear 384 and on to coupler 44. In the preferred embodiment, coupler 44 is an AAR Type F70DE coupler, used in conjunction with an AAR Y45AE coupler yoke and an AAR Y47 pin. In the preferred embodiment, draft gear 384 is a Mini-BuffGear, such as is available, for example, from Miner Enterprises, supra, or from the Keystone Railway Equipment Company, of 3420 Simpson Ferry Road, Camp Hill, Pa. As taken together, this draft gear and coupler assembly yields a reduced slack, or low slack, short travel, coupling as compared to a Type E coupler with standard draft gear or an hydraulic EOCC device. As such it may tend to reduce overall train slack, and may tend to reduce the range of travel to be accommodated by bridge plates 150. In addition to mounting the Mini-BuffGear directly to the draft pocket, that is, coupler pocket 62, and hence to the structure of the rail car body of car unit 34, the construction described and illustrated is free of other long travel draft gear, sliding sills and EOCC devices, and the fittings associated with them.

Mini-BuffGear has between ⅝ and ¾ of an inch travel in buff at a compressive force of 700,000 Lbs. Other types of buff gear can be used that will give an official rating travel of less than 2½ inches, or if not rated, then a travel of less than 2½ inches under 500,000 Lbs. buff load. For example, while Mini-BuffGear is preferred, other draft gear is available having a travel of less than 1¾ inches at 400,000 Lbs. buff load. One type has about 1.6 inches of travel at 400,000 Lbs. buff load. It is even more advantageous for the travel to be less than 1.5 inches at 700,000 Lbs. buff load and, as in the embodiment of FIGS. 12a and 12b, preferred that the travel be at least as small as 1" inches or less at 700,000 Lbs. buff load.

Similarly, while the AAR Type F70DE coupler is preferred, other types of coupler having less than the ²⁵⁄₃₂" (that is, less than about ¾") nominal slack of an AAR Type E coupler generally or the ²⁰⁄₃₂" slack of an AAR E50ARE coupler. In particular, in alternative embodiments with appropriate housing changes where required, AAR Type F79DE and Type F73BE, with or without top or bottom shelves; AAR Type CS; or AAR Type H couplers can be used to obtain reduced slack relative to AAR Type E couplers.

Figure 10A:
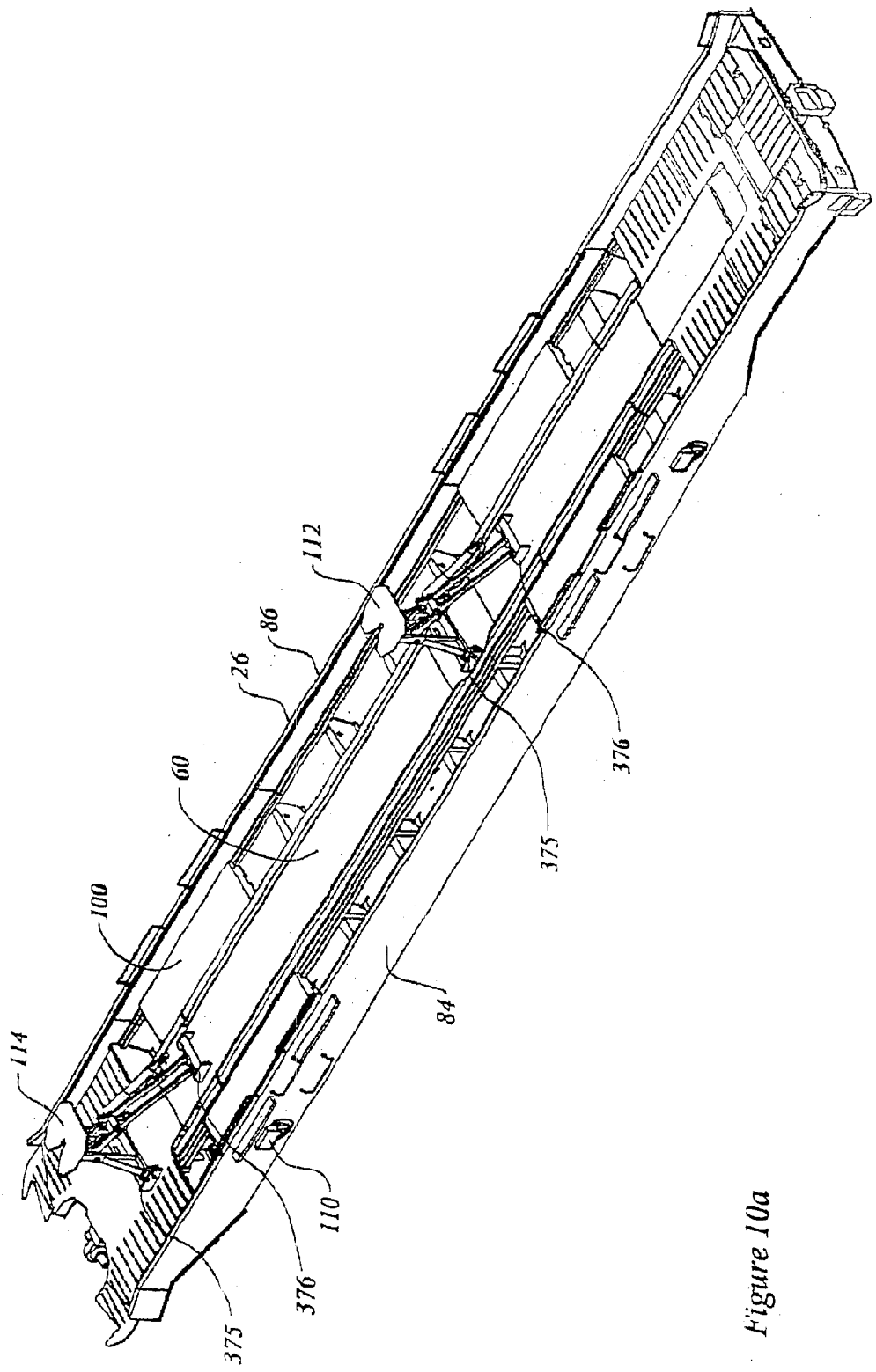
FIG. 10a shows an isometric view of a "A-End" unit of the articulated rail road car of FIG. 1a with middle floor deck plates removed for clarity.
Figure 10B:
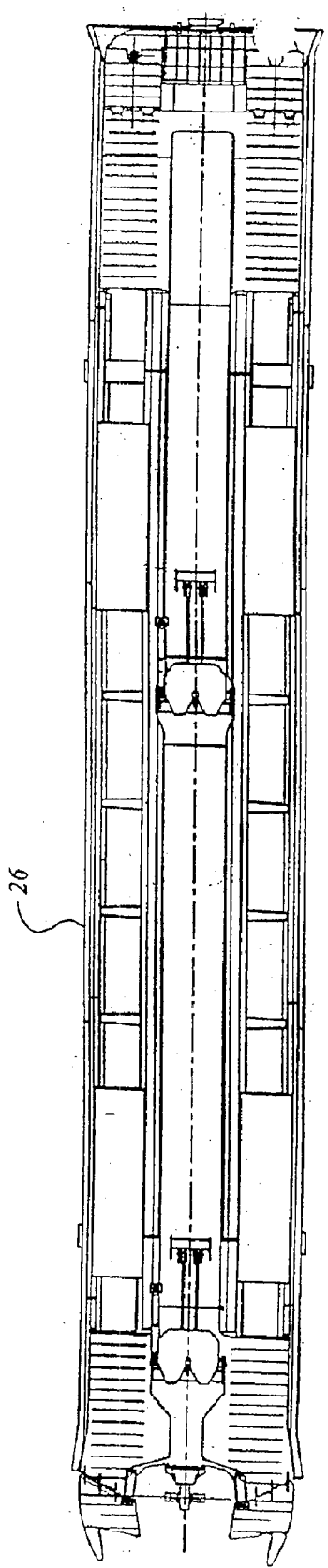
Figure 10C:
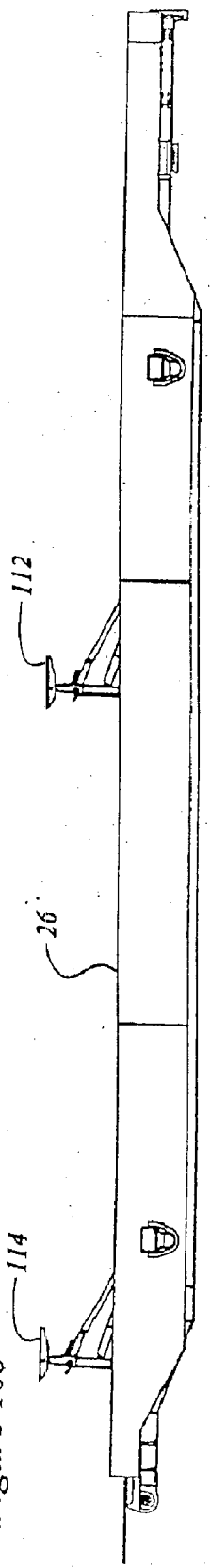
Figure 10D:
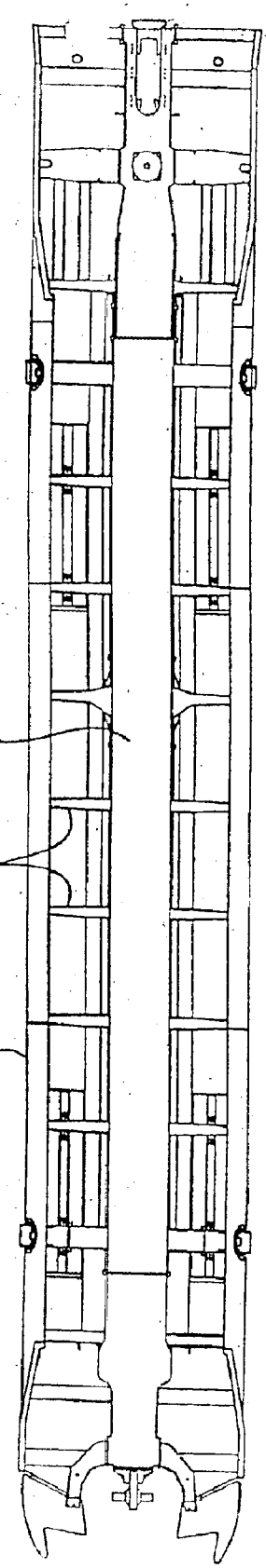
Figure 11A:
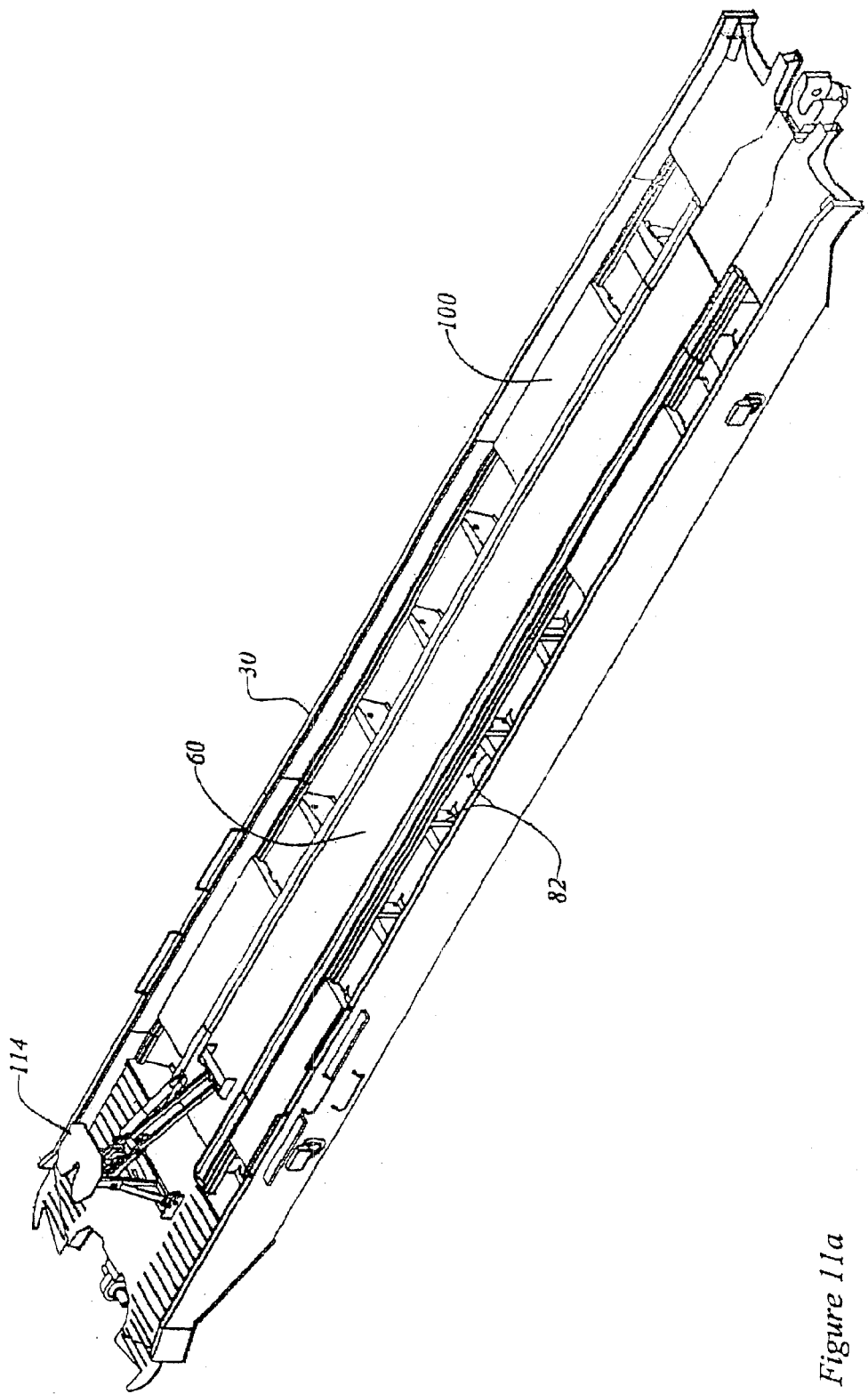
FIG. 11a shows an isometric view of an intermediate "C" unit of the articulated rail road car of FIG. 1a with middle floor deck plates removed for clarity.
Figure 11B:
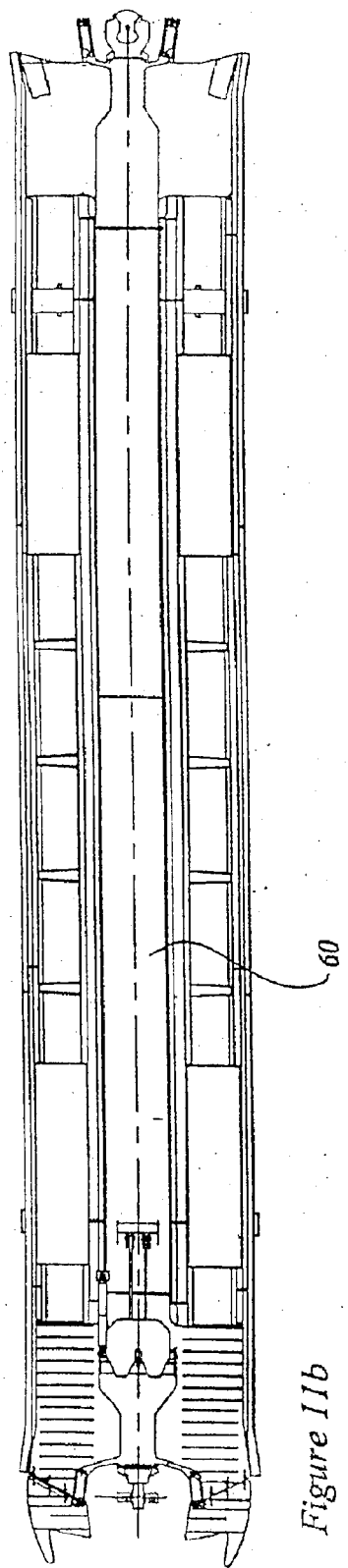
Figure 11C:
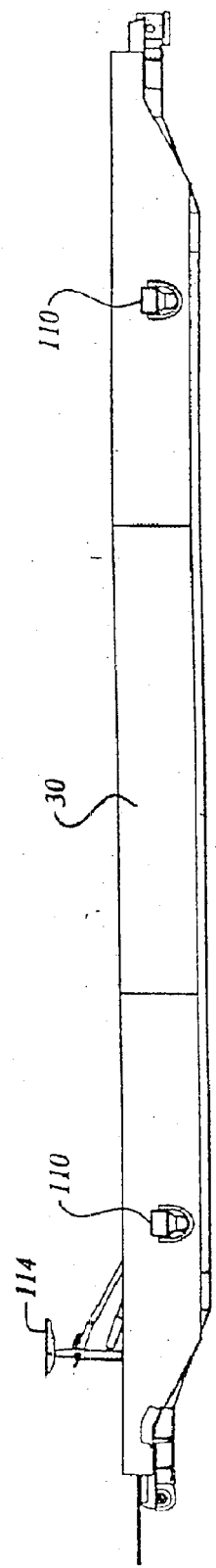
Figure 11D:
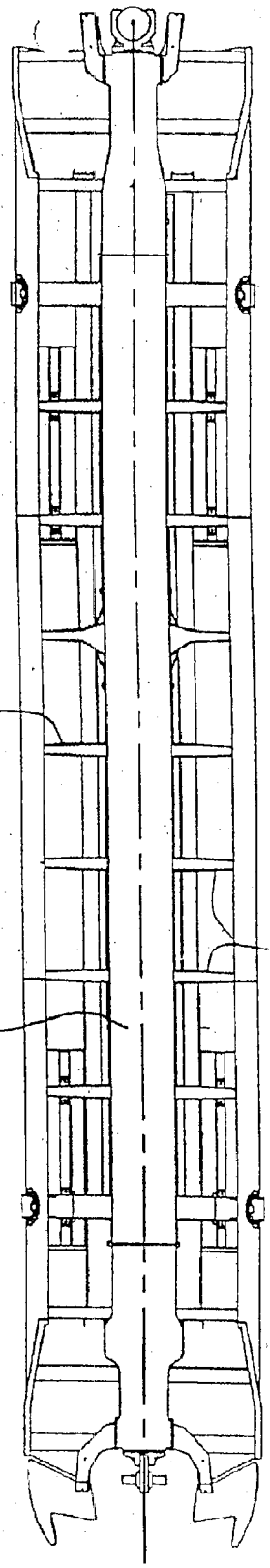

Other than brake and minor fittings, the basic structure of center sill, cross-bearer and decking structure of intermediate car unit 30 is substantially the same as car units 26 and 34. Car unit 26, shown in FIGS. 10a (isometric), 10b (top), 10c (side view) and 10d (underframe) differs from car unit 34 primarily in having a female set of side bearing arms, like those of car unit 30 adjacent to car unit 34. The hitch arrangement will be different, with the hitches on all of car units 26, 30 and 34 being arranged such that trailers mounted thereon will have their forward ends (i.e, the end with the king pin) facing toward end portion 64 of car unit 34. Car units 26, 30 and 34 may also vary in their brake arrangements, and other fittings, but share the same basic structural features. However, as intermediate unit 30, shown in FIGS. 11a (isometric), 11b (top), 11c (side view) and 11d (underframe) has no coupler end, its construction can be conceptualized as having the articulation connection end of car unit 34 taken from a mid span section, with a set of male side bearing arms, and the articulation connection end of car unit 26 with female side bearing arms, also taken from mid-span section, and joining them together in one car, with the pair of female side bearing arms facing car unit 34 and the pair of male side bearing arms facing car unit 30.

Various embodiments of the invention have now been described in detail. Since changes in and or additions to the above-described best mode may be made without departing from the nature, spirit or scope of the invention, the invention is not to be limited to those details.

We claim:

1. A bridge plate for mounting at a coupler end of a rail road car, the rail road car having a deck onto which wheeled vehicles can be driven from that coupler end, said bridge plate being movable about a pivot pin between an extended position for permitting loading of the wheeled vehicles onto the rail road car and another position, said pivot pin being removably engageable to the rail road car, and said bridge plate being operable to remain extended between the rail road car and another like rail road car when the rail road cars are moving.

2. The bridge plate of claim 1 having a surface upon which the wheeled vehicles can be conducted, wherein said surface has traction bars mounted thereto.

3. The bridge plate of claim 2 having at least one hand grab mounted thereto to facilitate manipulation of said bridge plate between the extended position and the other position.

4. The bridge plate of claim 3, wherein said bridge plate comprises aluminum.

5. A bridge plate assembly for mounting at a coupler end of a rail road car for carrying wheeled vehicles, the bridge plate assembly permitting the wheeled vehicles to be conducted onto the rail road car from that coupler end, said bridge plate assembly comprising:

a spanning member;

a first pivot pin about which said spanning member can be moved between an extended position for loading vehicles on the rail road car and another position, the first pivot pin being engageable to the rail road car;

a second pivot pin, said second pivot pin being removably engageable to said rail road car, to permit said spanning member to move between said extended position and said other position; and said second pivot pin being engageable to impede said spanning member from moving from said other position; and said spanning member being operable to remain in said extended position between the rail road car and another like rail road car coupled thereto when the rail road car is moving.

6. The bridge plate assembly of claim 5, wherein when another like spanning member of another bridge plate assembly of the other like rail road car is in a co-operating extended position, said second pin is engageable to retain said other spanning member in the co-operating extended position.

7. The bridge plate assembly of claim 6, wherein said spanning member has a surface upon which the wheeled vehicles can be conducted, and said first pivot pin engages said spanning member along a first axis predominantly normal to said surface.

8. The bridge plate assembly of claim 7, wherein said second pivot pin can engage said spanning member along a second pivot axis that is predominantly normal to said surface.

9. The bridge plate assembly of claim 6, wherein said spanning member has a first end and a second end, said first end having a first pivot pin engagement fitting for engagement with said first pivot pin to permit pivoting motion of the spanning member about said first pivot pin, and said second end of has a second pivot pin engagement fitting, wherein when said spanning member is in said other position, said second pivot pin is engageable with said second pivot pin engagement fitting to retain said spanning member in said other position.

10. The bridge plate assembly of claim 9, wherein said first pivot pin has a substantially vertical axis when engaged with said first pivot pin engagement fitting.

11. The bridge plate assembly of claim 10, wherein said second pivot pin has a substantially vertical axis when engaged with said second pivot pin engagement fitting.

12. The bridge plate assembly of claim 11, wherein the second pivot pin may be removable and engageable by hand.

13. The bridge plate assembly of claim 12, wherein said first end is chamfered.

14. The bridge plate assembly of claim 13, wherein said second end has the form of a bifurcated toe.

15. The bridge plate assembly of claim 14, wherein a slot is defined between the bifurcated toe, and said second pivot pin engagement fitting is said slot.

16. The bridge plate assembly of claim 15, wherein said other position is a storage position.

17. The bridge plate assembly of claim 16, wherein said spanning member has at least one hand grab mounted thereto to facilitate manipulation of said spanning member.

18. The bridge plate assembly of claim 17, wherein the spanning member comprises aluminum.

19. The bridge plate assembly of claim 18, wherein said surface has traction bars mounted thereto.

20. The bridge plate assembly of claim 6, wherein said spanning member has at least one hand grab mounted thereto to facilitate manipulation of said spanning member.

21. The bridge plate assembly of claim 20, wherein the spanning member comprises aluminum.

22. The bridge plate assembly of claim 21, wherein the second pivot pin may be removable and engageable by hand.

23. The bridge plate assembly for mounting at a coupler end of a rail road car for carrying wheeled vehicles, the bridge plate assembly permitting the wheeled vehicles to be conducted onto the rail road car at the coupler end thereof from another rail road car coupled thereto, said bridge plate assembly comprising:

a spanning member;

a first pivot pin to the rail road car and about which said spanning member can be moved between an extended position for loading vehicles on the rail road car and another position;

a second pivot pin, said second pivot pin being engageable to retain said spanning member in said other position; and, when said spanning member is extended, and a like spanning member of the adjacently coupled rail road car is in a corresponding extended position, said second pivot pin being operable to maintain that like spanning member in that corresponding extended position.

* * * * *